United States Patent [19]
Toyomura

[11] Patent Number: 6,037,734
[45] Date of Patent: Mar. 14, 2000

[54] MOTOR VELOCITY CONTROLLING METHOD EMPLOYING DETECTION OF ALL SIDE EDGES OF PHASE SIGNALS OF AN ENCODER TO GENERATE CONTROL TARGET VALUES FOR UPDATING A MOTOR CONTROL COMMAND

[75] Inventor: Yuji Toyomura, Fukuoka, Japan

[73] Assignee: Matsushita Electric Industrial Co., Ltd., Osaka, Japan

[21] Appl. No.: 09/080,288

[22] Filed: May 18, 1998

[30] Foreign Application Priority Data

May 21, 1997 [JP] Japan ................................. 9-130763

[51] Int. Cl.[7] .................................................. H02P 7/00

[52] U.S. Cl. ........................................... 318/602; 318/254

[58] Field of Search ........................... 318/602, 609–610, 318/254, 616, 439, 466–472; 388/804, 811, 812, 819, 906, 909; 324/161, 163, 165, 166, 175

[56] References Cited

U.S. PATENT DOCUMENTS

| | | | |
|---|---|---|---|
| 4,371,819 | 2/1983 | Kaufmann | 388/811 |
| 4,463,300 | 7/1984 | Mayne et al. | 318/687 |
| 4,503,374 | 3/1985 | Sakano | 318/616 |
| 4,529,920 | 7/1985 | Yoshida et al. | 318/466 |
| 4,628,314 | 12/1986 | Morinaga et al. | 340/870.24 |
| 4,680,516 | 7/1987 | Guzik et al. | 388/812 |
| 5,729,102 | 3/1998 | Gotou et al. | 318/254 |

*Primary Examiner*—Jonathan Salata
*Attorney, Agent, or Firm*—Stevens, Davis, Miller & Mosher, L.L.P.

[57] ABSTRACT

An encoder produces a plurality of different phase signals. A detecting unit detects all edges of the plurality of different phase signals from the encoder. A central processing unit (CPU) measures edge intervals of edges succeeding with respect to time. A first process is for obtaining a control target value on the basis of a value measured by the CPU, and a second process is for controlling the drive speed of the drive source on the basis of the result of comparing the value measured by the CPU and the control target value.

15 Claims, 17 Drawing Sheets

MOTOR VELOCITY CONTROLLING METHOD EMPLOYING DETECTION OF ALL SIDE EDGES OF PHASE SIGNALS OF AN ENCODER TO GENERATE CONTROL TARGET VALUES FOR UPDATING A MOTOR CONTROL COMMAND

BACKGROUND OF THE INVENTION

1. Field of the Invention

The present invention relates to a method of controlling a drive source such as a motor by use of an output from an encoder coupled to or provided to be integral with the drive source, and particularly to a method of controlling a drive source so that the drive source can be driven to keep at a constant speed.

2. Description of the Related Art

A conventional method of controlling a drive source will be described with reference to FIG. 14.

FIG. 14 is a block diagram showing the outline of the conventional method of controlling a drive source. Referring to FIG. 14, there are shown a drive source 1 such as a DC motor, and an encoder 2 provided on a shaft of the drive source 1 so that the encoder can generate a pulse each time the drive source 1 rotates by a certain angle. There are also shown an A-phase signal 3a from the encoder 2, and a B-phase signal 3b from the encoder 2. The phases A and B of those signals are generally designed to be shifted by 90°, but sometimes have error of about ten or more percent. In addition, the duty ratio of each phase signal is designed to be 50%, but sometimes has error of about ten and several percents. There are shown edge detectors 4a, 4b, which detect the leading edge and trailing edge of each of the A-phase and B-phase signals 3a, 3b to produce pulses. A rotation direction detector 5 detects the rotation direction of the drive source 1 according to the state (Low or High) of the B-phase signal 3b when the leading edge of the A-phase signal 3a is detected, for example.

A composing circuit 6 calculates the logical sum, OR of the outputs from the edge detectors 4a, 4b to produce pulses which includes all the pulses generated by detecting the leading and trailing edges of each of the A-phase and B-phase signals 3a, 3b. An up/down counter 7 counts up or down the pulse from the composing circuit 6 in accordance with the output of the rotation direction detector 5. The object to be driven by the drive source 1 can be detected in its position by referring to the output of the up/down counter 7. A prescaler 8 divides its input signal at a desired rate. A selector 9 can select one of the outputs of the prescaler 8 and encoder 2. There are also shown a central processing unit (hereinafter, abbreviated "CPU") 10, a clock generator 11 for generating a clock signal to the CPU 10, a motor driver 12 which controls the rotation speed of the drive source 1 on the basis of a control signal produced from the CPU 10.

With reference to FIGS. 14 and 15, a detailed description will be made of the process in which the CPU 10 obtains the speed information of the drive source 1. In FIG. 15, reference numeral 13 denotes the output signal of the selector 9; 14a, 14b, 14c and 14d the leading edges of the selector output signal 13; and 15ab, 15bc and 15cd the time intervals between the leading edges 14a and 14b, between the leading edges 14b and 14c, and between the leading edges 14c and 14d. In addition, reference numeral 16ab, 16bc and 16cd denote the count values about the clock signal (described later) in the time intervals 15ab, 15bc and 15cd. Reference numerals 17b, 17c and 17d denote the interruption requests to the CPU 10.

The CPU 10 measures the intervals between the leading edges of the selector output signal 13, or the time intervals 15ab, 15bc and 15cd by counting the clock signal produced from the clock generator 11. The CPU 10 includes a built-in counter (not shown) for this purpose, and a built-in register (not shown) for holding the count value of the built-in counter.

The built-in counter is a free-run counter which is incremented each time it receives the clock pulse from the clock generator 11, and thus increases its count value with lapse of time.

When the leading edge of the selector output signal 13 is applied to the CPU 10, the count value of the counter which has counted the number of clock pulses is copied in the built-in register, and the count value of the counter is reset to zero. For example, the count value 16ab resulting from counting the clock signal in the time interval 15ab is held in the built-in register, and the count value of the built-in counter is immediately reset to zero. After resetting, the counter is incremented each time it receives the clock signal, and the count value 16ab stays copied in the built-in register.

The interruption request to the CPU 10 occurs at the leading edge. If the interruption request 17b to the CPU 10 occurs at the leading edge 14b, the CPU 10 reads out the count value held in the built-in register, for example. At this time, the current count value is the count value 16ab resulting from measuring the time interval 15ab. Since the count value 16ab is held in the built-in register until the next leading edge 14c comes, it can be easily obtained even by relatively slow interruption processing using software. Similarly, the CPU 10 can obtain the count value 16bc corresponding to the time interval 15bc when the interruption request 17c occurs at the leading edge 14c, and the count value 16cd corresponding to the time interval 15cd when the interruption request 17d occurs at the leading edge 14d.

If the drive source 1 is rotated at equal speed, the leading edges 14a, 14b, 14c and 14d of the output signal 13 occur at equal distances, and thus the time intervals 15ab, 15bca and 15cd are equal, so that the count values 16ab, 16bc and 16cd become all equal. However, if the rotation speed of the drive source 1 changes, the count values 16ab, 16bc and 16cd about the clock signal change according to the speed of the drive source 1 as shown in FIG. 15. If the speed of the drive source 1 is reduced, the interval between the leading edges of the selector output signal 13 becomes wide, leading to the increase of the count value. On the contrary, if the speed of the drive source 1 is increased, the interval between the leading edges of the output signal 13 becomes narrow, leading to the decrease of the count value. Therefore, the speed of the drive source 1 can be measured by the count value.

A detailed description will be made of the process in which the obtained count value is converted into the speed information.

The encoder signal is a signal indicating the "distance" generated each time the drive source (e.g. a motor) rotates by a predetermined angle. In addition, since the count value resulting from counting the clock signal indicates "time," the CPU 10 is able to produce the speed information of the drive source 1 by computing the "distance" divided by the "time." Since the "distance" can be considered to be constant in view of the property of the encoder, a proper value is defined as a speed conversion constant, and the speed conversion constant divided by the count value is calculated, so that the speed information can be obtained.

A detailed description will be made of the process in which the control signal is generated on the basis of the obtained speed information.

In order to obtain the final control signal, it is necessary to provide a control target as a guide of how the object to be controlled is controlled. Under speed control, it is ideal that the drive source is operated at a constant speed, and at this time the edge interval of the selector output signal 13 is decided by designing the drive system. Also, the frequency of the clock signal for use in counting the edge period is similarly decided during the design stage. Therefore, the count value (theoretical count value) of the built-in counter in the ideal state is also decided when the drive system is designed. Since the speed conversion constant is constant as described above, the ideal speed information (target speed) is decided to be equal to the speed conversion constant divided by the theoretical count value, and thus becomes naturally a constant value. The object of the control is to make the measured speed information equal to the theoretical speed. If this state can be assured, the system is ideally driven.

FIG. 16 is a flowchart of the conventional process for generating the control signal. The conventional example employs PI control. The PI control is a process using terms of P (proportional) and I (integral), and is also called proportional integration control. This control is a very popular feedback control process.

At step 1, speed deviation e is calculated according to the following equation (1).

$$\text{(speed deviation } e\text{)=(target speed)-(speed information)} \quad (1)$$

At step 2, the speed deviation e obtained at step 1 is accumulated (integrated) as shown by the following equation (2) to produce $$\text{(distance deviation)}=\Sigma e \quad (2)$$

At step 3, a speed command value is calculated using the speed deviation and the distance deviation according to the following equation (3).

$$\text{(speed command value)}=K\{\text{(speed deviation)+(distance deviation)/}T\} \quad (3)$$

The proportional integration control includes two coefficients of K and T, of which K is called a proportional coefficient, and T is called an integration coefficient. These coefficients depend on the hardware (motor, motor driver and so on) which constitutes the drive system, and are determined by a method of analog simulation by SPICE and so on, or limited sensitivity.

A method of changing the speed of the object to be controlled in the prior art will be described with reference to FIG. 14. For simplicity, the speed of the drive system is assumed to be a reference speed V when the CPU 10 selects the output directly from the encoder 2 as the selector output signal 13.

Let us consider that the drive speed is changed to 2×V. The CPU 10 sets the prescaler 8 to divide the input signal by two, and orders the selector 9 to select the output of the prescaler 8. Thus, the leading edges are supplied to the CPU 10 with twice (frequency=½) as long as the period at which the speed of the drive system is V. If the speed remains the reference speed V, the count value of the built-in counter of the CPU 10 is twice as large as that at the reference speed V, but the CPU 10 controls the drive source so that the count value of the built-in counter is constant. As a result, the speed of the drive source is 2×V. In other words, the edge period of the selector output signal 13 at the reference speed V is equal to that at the speed 2×V. Plainly speaking, (speed)×(prescaler division ratio)=constant. However, since the amount of difference per time in the drive system is increased with the increase of speed, the loop gain of the control system must be changed in accordance with speed. Specifically, the proportional coefficient K mentioned with reference to FIG. 16 is increased or decreased according to speed. If the speed is 2×V, the coefficient K is multiplied by two as is the speed, thus compensating the loop gain.

The relation between the drive speed and the encoder output will be described with reference to FIG. 17. In FIG. 17, the small circles ○ indicate the controlled points of the drive source by the CPU 10.

According to the above method, when the drive speed is controlled to be higher than the reference speed V ((c) of FIG. 17), the encoder signal is simply thinned by the prescaler 8. For example, the drive speed is changed to twice the reference speed V by thinning the encoder signal to ½ ((b) of FIG. 17), and to four times the reference speed V by thinning the encoder signal to ¼ ((a) of FIG. 17), with the service period of the CPU 10 being constant as indicated by the small circles ○.

However, since the encoder signal cannot be increased, the speed cannot be easily controlled to be slower than the reference speed V. The small squares □ in (d) and (e) of FIG. 17 indicate the controlled points at which no service can be executed by the CPU 10. For example, when the speed is ½×V, the number of times that the CPU 10 can offer control/arithmetic service is reduced to ½ ((d) of FIG. 17) and to ¼ ((e) of FIG. 17) that at the time of the reference speed V. The reduction of the number of times of service directly results in the reduction of control performance, particularly of servo band.

There is a method shown in FIG. 18 as a counter-measure against that, for example. FIG. 18 is a diagram showing a method of simply increasing the number of times that the CPU 10 can offer service. In FIG. 18, the small circles ○ indicate edges at which the CPU 10 offers service. When the drive speed is the reference speed V, the CPU 10 executes control operation using the one-side edges of the single-phase signal (for example, A-phase) from the encoder 2. When the drive speed is ½ the reference speed V, the CPU 10 controls using the both-side edges of the single-phase signal (for example, A-phase) from the encoder 2. When the drive speed is ¼ the reference speed V, the CPU 10 controls using the both-side edges of the two-phase signals (A-phase, B-phase) from the encode 2.

This method is able to very simply assure the number of times that the CPU 10 offer service. However, originally the servo operation is performed under the condition that the edge interval (=distance) of the signal from the encoder 2 is always kept constant, whereas the above method sometimes cannot satisfy this condition.

The case of unequal edge distance will be described with reference to FIGS. 19A and 19B.

FIG. 19A shows the different phase-signals of the encoder 2 each of which has a duty ratio of 50% and a phase difference of 90°. FIG. 19B shows the different phase-signals with a disturbed phase relation different from the state shown in FIG. 19A because of, for example, low precision of encoder 2. In FIG. 19A, when the drive source is ideally driven, the four intervals (interval A: between the leading edge of A-phase and the leading edge of B-phase, interval B: between the leading edge of B-phase and the trailing edge of A-phase, interval C: between the trailing edge of A-phase and the trailing edge of B-phase, and interval D: between the trailing edge of phase-B and the leading edge of phase-A) are all equal. Thus, the edge intervals are equal if all edges of the two-phase signals are obtained.

However, in FIG. 19B, since the duty ratio is not 50% and the phase difference is not 90°, the four intervals A', B', C' and D' produced by the two A-and B-phase signals are different from each other. Even if the drive source is driven ideally, the edge intervals formed at the variable points of each phase signal are not equal.

Since the servo operation is performed under the condition that the edge intervals (=distances) of the phase signals of the encoder 2 are always equal as described above, the control signal produced as the result of arithmetic operation in the state shown in FIG. 19B oscillates with the period of interval A, interval B, interval C and interval D as one cycle. Therefore, the drive source generates abnormal sound coincident with the oscillation period, and the operation of all the control system becomes unstable.

Most commercially available encoders exhibit such the characteristic as shown in FIG. 19B, and there are even some encoders which generate phase signals of which the phase difference and duty ratio have error of ten or more percent.

The conventional drive source controlling method mentioned above has the following problems. When the speed of the drive source is controlled to be slower than the reference speed V, the resolution of the encoder is relatively reduced, so that it is difficult to assure the control band. Since the edge intervals of signals from the encoder become wider as the drive source speed decreases as shown in FIG. 18, fast response cannot be expected when the system speed changes. In general, the reciprocal (frequency) of the period of the leading edges is the sampling rate. When the sampling rate is reduced, the number of times of service is reduced, and the control performance of the servo system is deteriorated.

Although a high-resolution encoder can be used, the high-resolution encoder is generally very expensive, and thus increases the cost.

In addition, since the encoder produces signals of A- and B-phase, it is theoretically possible to assure four times as high as the sampling rate of the prior art by, for example, detecting the both-side edges of both the A-phase signal and the B-phase signal, and by obtaining the speed information and controlling on the basis of this detected timing according to the above method. However, as described in detail with reference to FIGS. 19A and 19B, the duty ratio and phase difference of the difference phase signals of the encoder scatter within the range of ten or more percent, and thus reliance cannot be placed on the information which is to show a constant interval. If controlling is made in disregard of this fact, abnormal sound will be generated from the drive source or the operation of the control system will become unstable.

SUMMARY OF THE INVENTION

It is an object of the present invention to provide a drive source controlling method capable of solving the above problems, that is, assuring the frequency band without reducing the sampling rate even when the drive source is driven to be slow, and preventing abnormal sound and unstable operation of the control system from being caused when the sampling rate is simply assured by detecting both-side edges of both different phase signals.

A drive source controlling method according to the present invention utilizes an encoder for producing a plurality of different phase signals of A-phase and B-phase, detecting means for detecting leading edges and trailing edges of all the plurality of different phase signals, and measuring means for measuring intervals between adjacent edges, and comprises a first process for obtaining a control target value on the basis of a value produced from the measuring means, and a second process for controlling a drive speed of the drive source on the basis of a result of comparing the value obtained by the measuring means and the control target value. Thus, in the first process, it is possible to obtain the control target value corresponding to the scatter of the encoder. Further, in the second process, it is possible to control the drive source on the basis of the control target value obtained in the first process.

Moreover, in the first process, the detecting means detects the leading edges and trailing edges of the A-phase and B-phase signals of the encoder, and the measuring means measures the four intervals of the interval between the leading edge of the A-phase signal and the leading edge of the B-phase signal, the interval between the leading edge of the B-phase signal and the trailing edge of the A-phase signal, the interval between the trailing edge of the A-phase signal and the trailing edge of the B-phase signal, and the interval between the trailing edge of the B-phase signal and the leading edge of the A-phase signal. Further, the four intervals are taken as one cycle, and a control command to the drive source is updated at a rate of once per cycle. Thus, the control target value can be obtained for each interval unit.

First particular state detecting means is also provided to detect a particular edge of a particular phase signal (for example, the leading edge of the A-phase signal) of the plurality of different phase output signals. The sequence of the first process is controlled on the basis of the first particular state detected timing. Thus, the four intervals can be specified.

In addition, the sequence of the second process is controlled on the basis of the first particular state detected timing. Thus, the four intervals can be specified, the control target value measured for each interval is selected, and controlling can be made on the basis of the target value.

Moreover, in the first process, the detecting means detects the leading edge and trailing edge of one of the plurality of different phase output signals, and the measuring means measures the edge intervals of the two intervals between the leading edge and the trailing edge and between the trailing edge and the leading edge. The two intervals are taken as one cycle, and the control command to the drive source is updated once per cycle. Thus, even when there is no time to spare in the measuring means, it is possible to obtain the control target value for each interval.

Second particular state detecting means is also provided to detect a particular edge (for example, the trailing edge) of one of the plurality of different phase output signals. The sequence of the first process is controlled on the basis of the second particular state detected timing. Thus, it is possible to specify the above two intervals.

In addition, the sequence of the second process is controlled on the basis of the second particular state detected timing. Thus, the above two intervals can be specified, the control target value measured for each interval can be selected, and controlling can be made on the basis of the target value.

There is also provided a drive source controlling method which utilizes an encoder for producing a one-phase signal, detecting means for detecting all edges of the one-phase output signal, and measuring means for measuring edge intervals between adjacent edges, and which comprises a first process for obtaining a control target value on the basis of a value produced from the measuring means, and a second process for controlling the drive speed of the drive source on the basis of the result of comparing the value from the measuring means and the control target value. Thus, in the first process, it is possible to obtain the control target value corresponding to the scatter of the encoder, and in the second process, it is possible to control the drive source on the basis of the control target value obtained in the first process.

Moreover, in the first process, the detecting means detects the leading edge and trailing edge of one-phase output signal, and the measuring means measures the edge interval of the two intervals between the leading edge and the trailing edge and between the trailing edge and the leading edge. The two intervals are taken as one cycle, and the control command to the drive source is updated once per cycle. Thus, the above two intervals can be specified.

Particular state detecting means is also provided to detect a particular edge (for example, the leading edge) of the one-phase output signal. The sequence of the first process is controlled on the basis of the particular state detected timing. Thus, the above two intervals can be specified.

In addition, the sequence of the second process is controlled on the basis of the particular state detected timing. Thus, the above two intervals can be specified, the control target value measured for each interval can be selected, and controlling can be made on the basis of the target value.

Moreover, memory means for storing the control target value is provided. The first process is executed immediately after the power supply to the apparatus including the drive source is turned on, the control target value is stored in the memory means, and then the drive source is controlled on the basis of the control target value stored in the memory means. Thus, even when the drive source frequently starts and stops, wasteful time can be avoided.

In addition, memory means for storing the control target value is provided. The edge intervals are measured during the second process, and the control target value is updated according to the measured results. Thus, the drive source can always stably controlled.

DESCRIPTION OF THE PREFERRED EMBODIMENTS

First Embodiment

A first embodiment of the present invention will be described with reference to the drawings. The first embodiment is the application of the present invention to an image scanner.

Recently, work-stations, personal computers and so on have advanced significantly to include multi-functions, or to be capable of fast processing of color image editing, electronic filing and character reading-in by OCR (optical character-reading system). A flat bed type image scanner which can easily read in images has come into wide use. This kind of apparatus employs a drive source such as a DC motor in order to read a manuscript placed on the apparatus.

Figure 1:
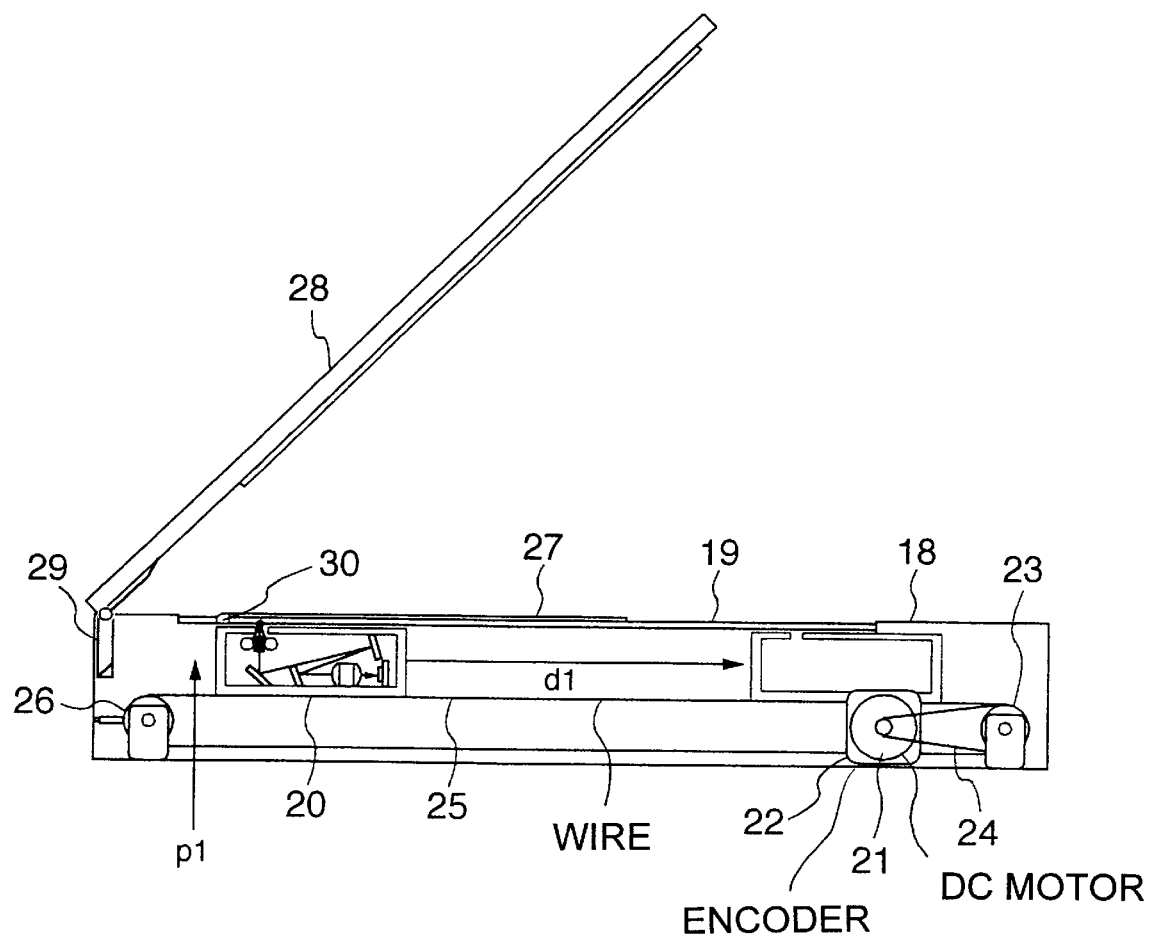
FIG. 1 is a diagram of an image scanner to which a drive source controlling method of the present invention is applied.

FIG. 1 shows an outline of an image scanner to which a drive source controlling method of the present invention is applied. Referring to FIG. 1, there are shown an image scanner body 18, a manuscript glass 19 on which a manuscript to be read is placed, and a carriage 20 which scans the manuscript and reads it. The carriage 20 is supported by a support member such as a shaft or rail (not shown), and restricted to move in one direction by the support member. There are also shown a DC motor 21 as a drive source for driving the carriage 20, and an encoder 22 directly connected to the shaft of the drive source 21. Each time the drive source 21 rotates by a predetermined amount, the encoder 22 generates A-phase and B-phase pulse signals with a duty ratio of about 50% and phase difference of about 90°. There are shown a drive pulley 23 and a timing belt 24. The motive power generated by the drive source 21 is transmitted via the timing belt 24 to the drive pulley 23. There are shown a wire 25 and a slave pulley 26. The wire 25 is extended between the drive pulley 23 and the slave pulley 26, and causes the carriage 20 to move in the direction d1 or in the reverse direction as the drive pulley 23 is rotated.

A manuscript 27 is placed on the manuscript glass 19. The manuscript 27 is read out line by line as the carriage 20 moves. A manuscript cover 28 is supported by a pivot 29 so as to be able to open and close. Reference numeral 30 denotes a reference acquisition position. A white reference plate is attached onto the manuscript glass at this position. Indicated at p1 is the home position of the carriage 20. When the image scanner stands by, the carriage 20 is always in the home position p1.

Figure 2:
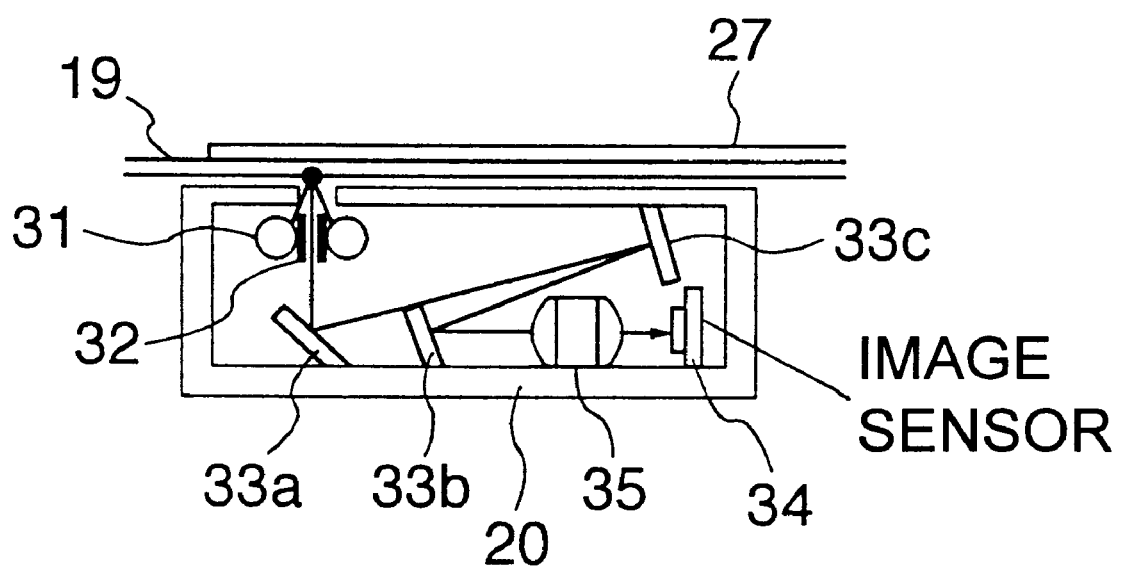
FIG. 2 is a cross-sectional diagram of the optical system of the image scanner to which the drive source controlling method of the present invention is applied.

FIG. 2 shows the outline of the optical system of the image scanner according to the drive source controlling method of the present invention. In FIG. 2, there are shown a lamp 31 for irradiating the manuscript, an aperture 32 which substantially specifies a position from which an image is read out, reflecting mirrors 33a, 33b and 33c for reflecting a reflected light from the manuscript, an image sensor 34 for converting optical information into an electric signal, and a focusing lens 35 for forming the image on the image sensor 34.

The operation of the image scanner constructed as above will be described with reference to FIGS. 1 and 2.

When the power supply to the scanner is turned on, the carriage 20 returns to the home position p1 irrespective of where it is initially positioned. The carriage 20 is moved to the reference acquisition position 30, the lamp 31 is turned on, and the reference plate is actually read in order to determine the amplification factor to the analog signal produced from the image sensor 34 and make correction (shading correction) for the black and white level. The carriage 20 again returns to the home position p1, and stands by.

The reading operation of the image scanner using the drive source controlling method of the present invention will be described in detail.

After the reading-out resolution, reading-out range and so on are set on an external host such as a personal computer (hereinafter, abbreviated "PC" and not shown), a read command to read the manuscript is issued to the scanner. The lamp 31 is turned on, and the drive source 21 is rotated. The motive power is transmitted through the timing belt 24, drive pulley 23, wire 25 and slave pulley 26 to the carriage 20. The carriage 20 is moved in the direction d1 at a speed corresponding to the reading-out resolution preset on PC. When the carriage 20 arrives at the head of the region corresponding to the reading-out range preset on PC, it starts to read the manuscript 27 placed on the manuscript glass 19. The manuscript 27 is irradiated by the lamp 31 through the manuscript glass 19. The reflected light from the manuscript 27 is further reflected from the reflecting mirrors 33a, 33b and 33c into the focusing lens 35 by which the image is formed on the image sensor 34. The image is converted into an electric signal. When the specified reading-out range is read out, the carriage 20 is moved in the direction opposite to the direction d1, and returns to the home position p1.

The image scanner changes the moving speed of the carriage 20 in accordance with the specified resolution decided on PC, and reads out the image.

Figure 3:
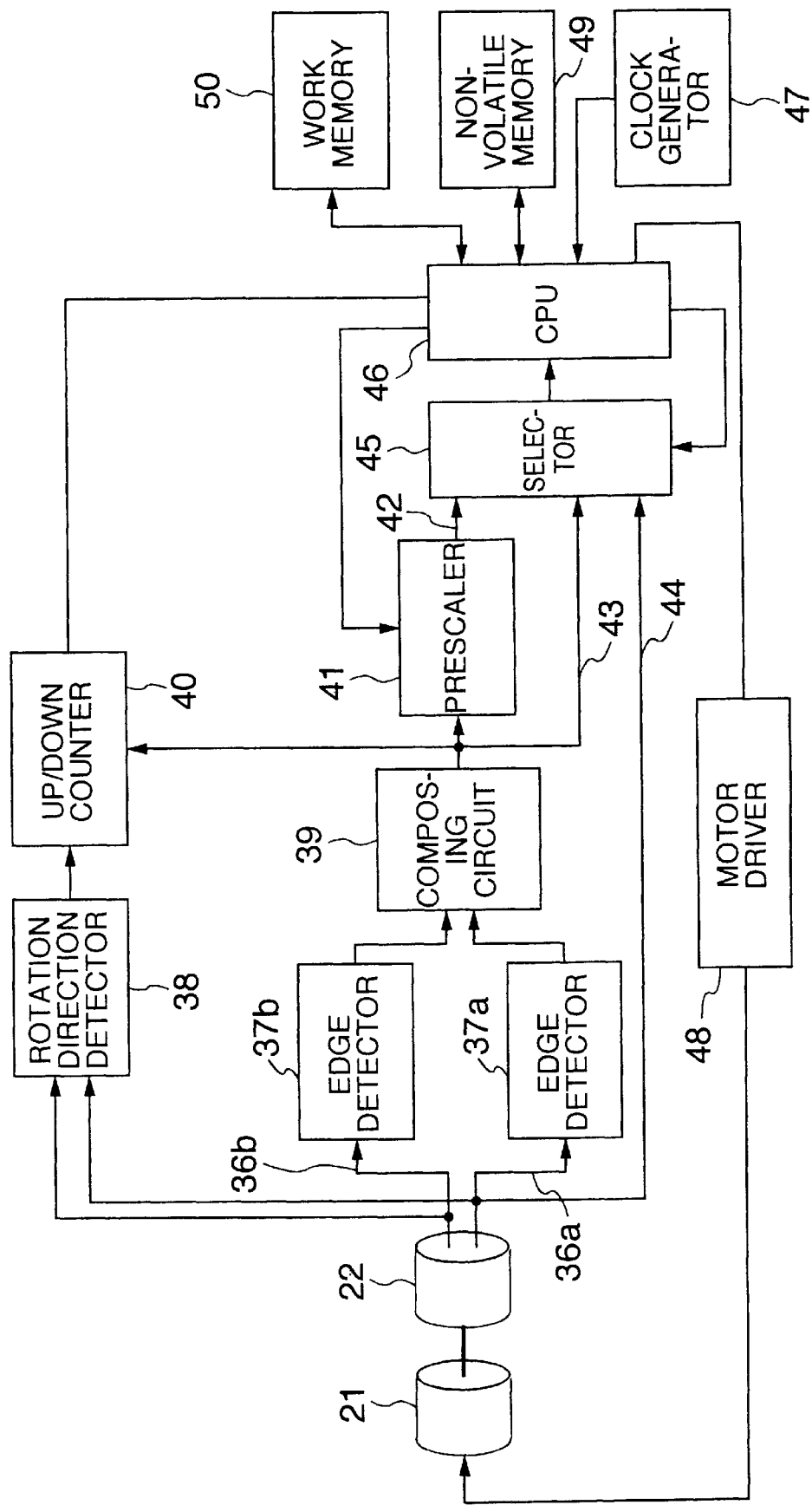
FIG. 3 is a block diagram showing the construction according to the drive source controlling method of the present invention.

The drive source controlling method of the present invention will be described in detail with reference to FIG. 3. FIG. 3 is a block diagram showing the construction according to the drive source controlling method of the invention.

Referring to FIG. 3, there are shown a drive source 21 as a DC motor for driving the carriage, and an encoder 22 directly connected to the shaft of the drive source 21. Each time the drive source 21 is rotated by a predetermined amount, the encoder 22 produces two different-phase pulse signals of A-phase and B-phase with a duty ratio of about 50% and phase difference of 90°. The A-phase signal 36a and the B-phase signal 36b are produced from the encoder 22. Although the A-phase signal 36a and B-phase signal 36b are generally designed to be shifted by 90°, the phase difference has error of ten and several percents. In addition, the duty ratio of each phase signal 36a and 36b is designed to be 50%, but it has error of ten and several percents. Edge detectors 37a, 37b detect the leading edges and trailing edges of the A-phase and B-phase signals 36a and 36b to produce pulses.

A rotation direction detector 38 detects the rotation direction of the drive source 21, or the moving direction of the carriage 20 in accordance with, for example, the state (Low or High) of the B-phase signal 36b when the leading edge of the A-phase signal 36a is detected. A composing circuit 39 calculates the logical sum, OR of the outputs of the edge detectors 37a and 37b to produce pulses at all the leading edges and trailing edges of the A-phase and B-phase signals 36a and 36b detected by the edge detectors 37a and 37b. An up/down counter 40 counts up or down the pulse produced from the composing circuit 39 in accordance with the output of the rotation direction detector 38. Thus, the position at which the carriage 20 driven by the drive source 21 is located can be detected by referring to the output of the up/down counter 40. A prescaler 41 divides the frequency of the input signal by a desired factor in accordance with the moving speed of the carriage 20 depending on the specified reading-out resolution. There are shown a prescaler output 42, the output of the composing circuit 39 (which output is not divided by the prescaler 41), and a single-phase output 44 of the encoder 22. A selector 45 selects one of the prescaler output 42, composing circuit output 43 and encoder single-phase output 44. There are shown a central processing unit 46 (hereinafter, abbreviated "CPU"), and a clock generator 47 which generates a clock signal to the CPU 46. A motor driver 48 controls the rotation speed of the drive source 21 on the basis of the control signal of the CPU 46. A nonvolatile memory 49 is used for transmitting and receiving data to and from the CPU 46 in the case of, for example, serial communication. A work memory 50 is used as the work region for CPU 46.

The CPU 46 has a built-in counter (not shown), and a built-in register (not shown) which is used to copy the count value of the built-in counter. The built-in counter is fundamentally a free-run counter, and is incremented in its count value each time it receives the clock pulse generated in the clock generator 47. The CPU 46, when receiving the leading edge of the signal selected by the selector 45, makes the count value of the built-in counter that has so far counted the number of clocks be copied in the built-in register, and the count value of the built-in counter be set to zero.

Figure 4:
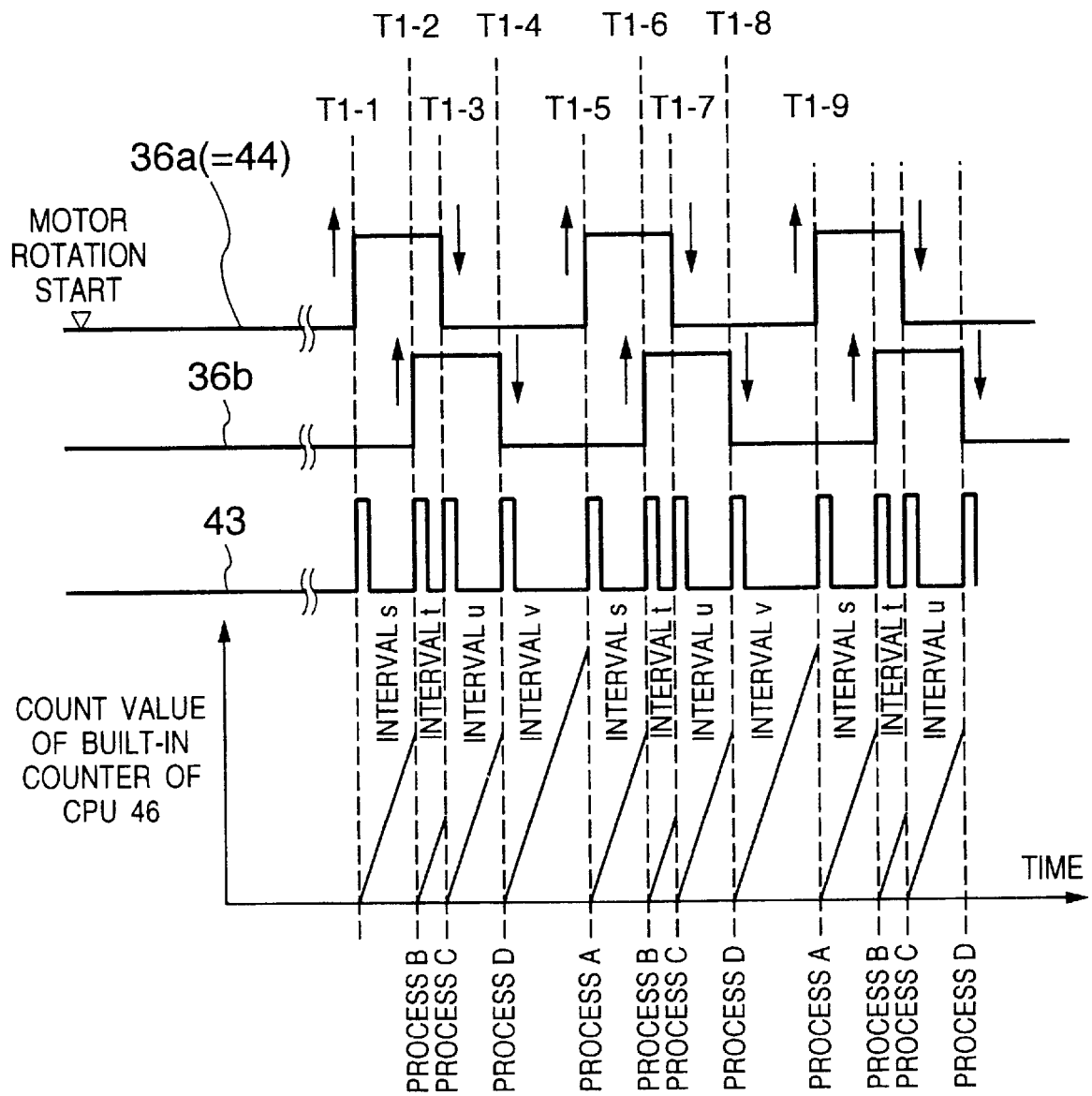
FIG. 4 is a timing chart showing a sequence of a first process in both-phase and both-side edge drive according to a first embodiment.

With reference to FIGS. 3 and 4, a description will be made of a first process of the present invention, or the process for obtaining the control target value in the case where the drive source is controlled to ¼ the reference speed V (hereinafter, this mode will be referred to as "both-phase and both-side edge drive") by referring to the leading edges and trailing edges of the A-phase and B-phase signals.

FIG. 4 is a timing chart showing the sequence of the first process of the both-phase and both-side edge drive in the first embodiment.

Before the rotation of the drive source 21 is started, the CPU 46 sets the selector 45 so that the encoder single-phase signal 44 (=encoder A-phase signal) can be supplied to the CPU 46. The CPU 46, under this condition, makes the speed control on the drive source 21. This process is the same as that in the prior art, and thus will not be described. In addition, the speed of the drive source 21 at this time is equal to that reached by driving the drive source 21 with reference to, for example, only the leading edge of A-phase signal, or to the reference speed V given in the above description about the prior art.

Immediately after the drive source 21 arrives at a predetermined rotation speed, the CPU 46 detects, by interruption, the timing T1-1 of the leading edge of the encoder single-phase signal 44. At this time, it alters the conditions set on the selector 45 so that the edge composing circuit output 43 can be supplied to the CPU 46, and clears the four-interval accumulation value into zero, which is a variable that is given on the work memory 50 and managed by software.

Since the other conditions of CPU 46 are not changed, the built-in counter of CPU 46 then counts the clock pulse generated from the clock generator 47 during the intervals s, t, u and v shown in FIG. 4, and each of the count value is copied in the built-in register (not shown).

When the CPU 46 detects the next leading edge timing T1-2, the count value in the interval s has been already copied in the built-in register. The CPU 46 reads out this count value from the built-in register, stores it as count value s in the work memory 50, and adds it to the interval accumulation value corresponding to the interval s. This process will be hereinafter referred to as "process B".

When the CPU 46 detects the next leading edge timing T1-3, the count value in the interval t has been already copied in the built-in register. The CPU 46 reads this count value from the built-in register, stores it as count value t in the work memory 50, and adds it to the interval accumulation value corresponding to the interval t. This process will be hereinafter referred to as "process C".

When the CPU 46 detects the next leading edge timing T1-4, the count value in the interval u has been already copied in the built-in register. The CPU 46 reads this count value from the built-in register, stores it as count value u in the work memory 50, and adds it to the interval accumulation value corresponding to the interval u. This process will be hereinafter referred to as "process D".

When the CPU 46 detects the next leading edge timing T1-5, the count value in the interval v has been already copied in the built-in register. The CPU 46 reads this count value from the built-in register, stores it as count value v in the work memory 50, and adds it to the interval accumulation value corresponding to the interval v. In addition, the count values s, t, u, and v stored in the work memory 50 are added. The result of the addition is equivalent to a count value obtained considering only the leading edge interval of the encoder single-phase signal 44.

The encoder single-phase signal 44 is a signal indicating "distance" that is generated each time the drive source 21 rotates by the predetermined angle. Also, since the result of adding the count values of the clock signal in each interval indicates "time", the CPU 46 is able to obtain the speed information of the drive source 21 by calculating the "distance" divided by the "time". Since the encoder generally produces the same edge interval of the same phase signal constantly with extremely high precision, the edge interval (i.e. "distance") is considered as constant, and a predetermined constant (hereinafter, called "speed conversion constant TRNV") is defined. This constant TRNV is divided by the result of adding the count values s, t, u and v, and treated as the speed information. This process will be hereinafter "process A".

Figure 16:
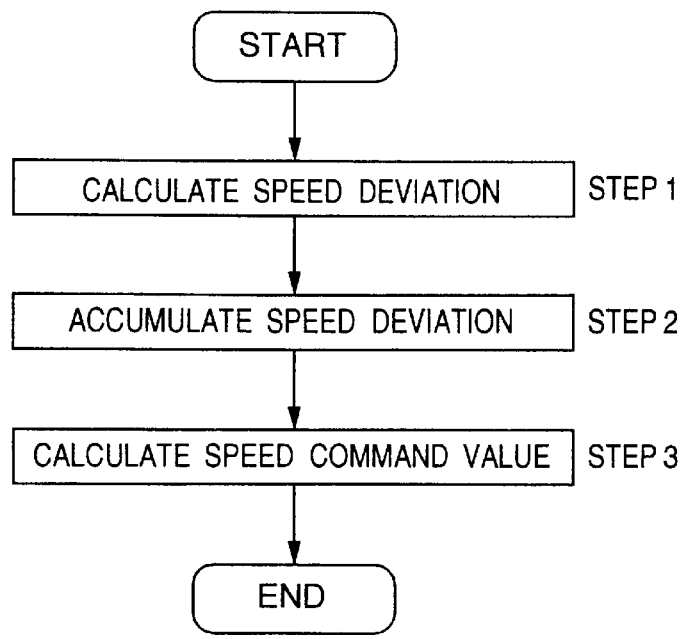
FIG. 16 is a flowchart of the control signal generating process in the conventional example.
Figure 17:
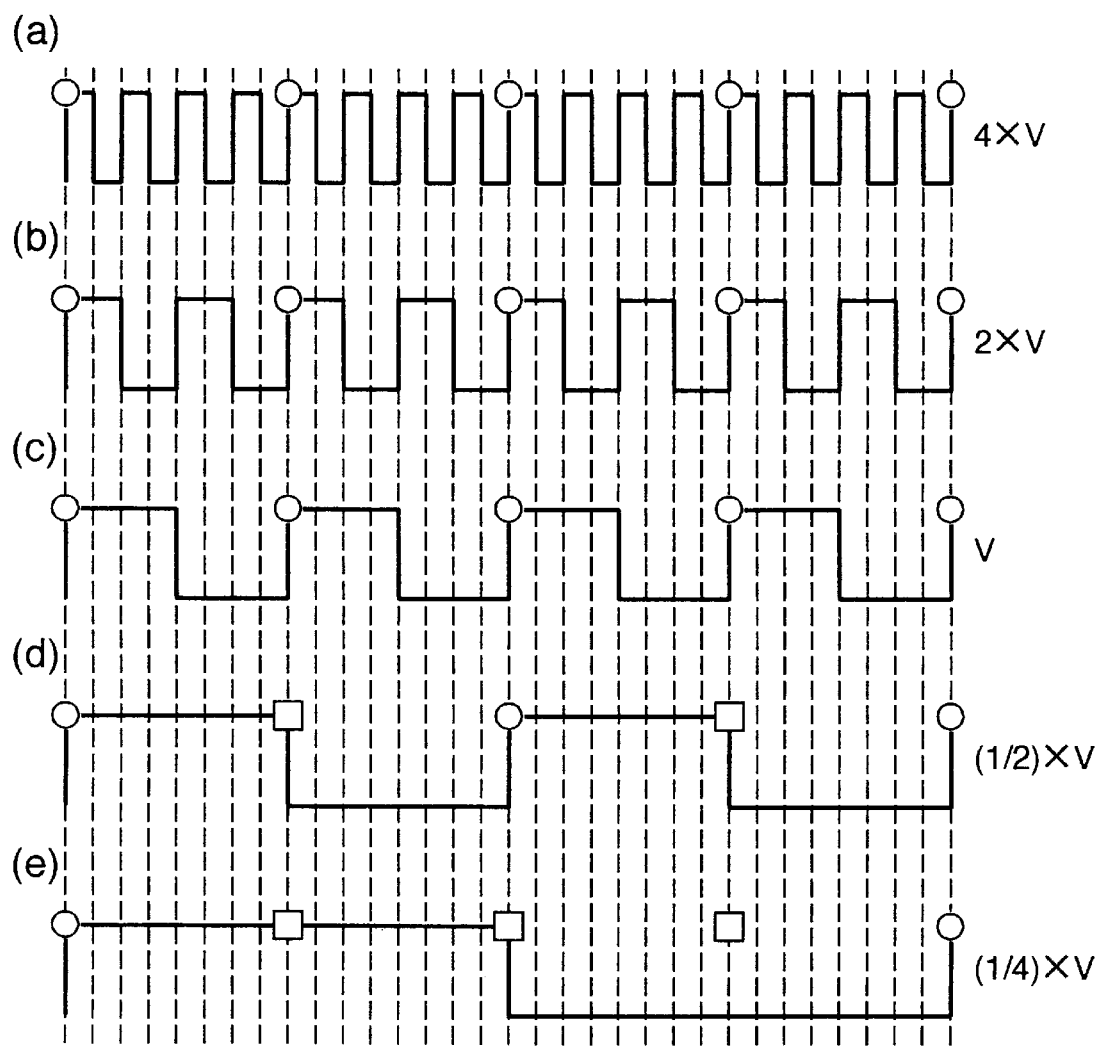
FIG. 17 is a diagram showing the relation between the drive speed and the encoder output.
Figure 18:
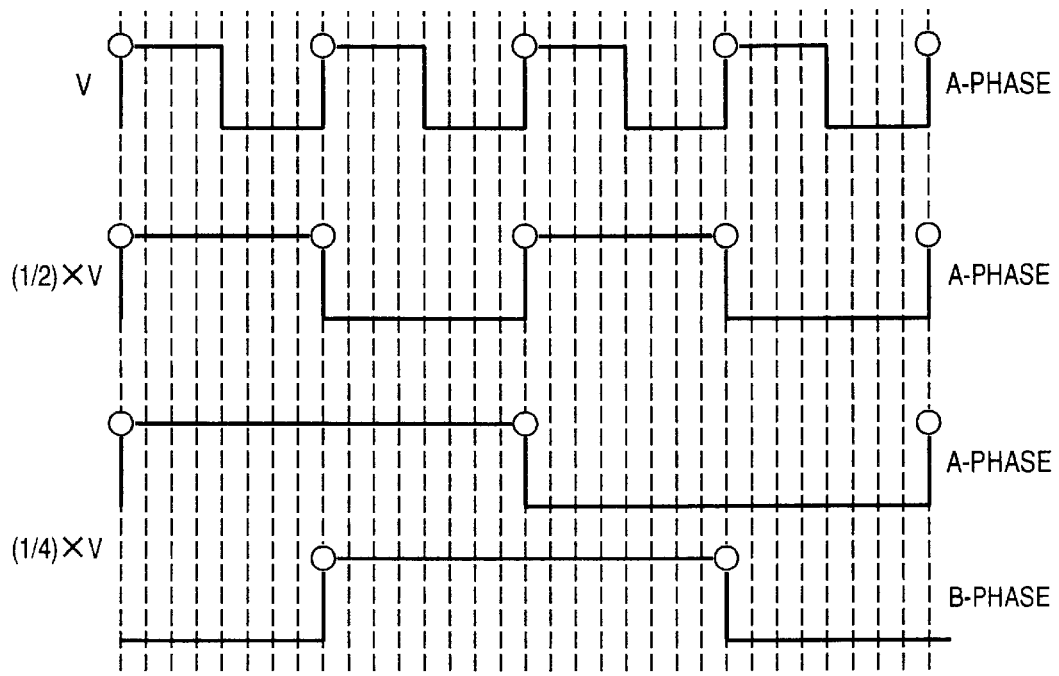
FIG. 18 is a diagram showing the method of simply increasing the number of times that the CPU makes service.
Figure 19A:
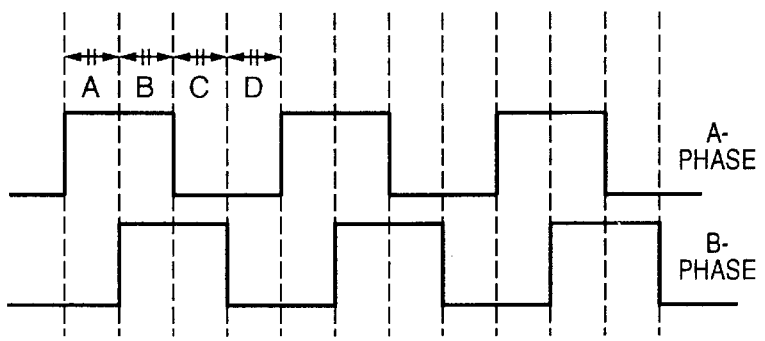
FIGS. 19A and 19B are diagrams showing the state of phase signals from the encoder with the duty ratio of 50% and phase difference of 90°.
Figure 19B:
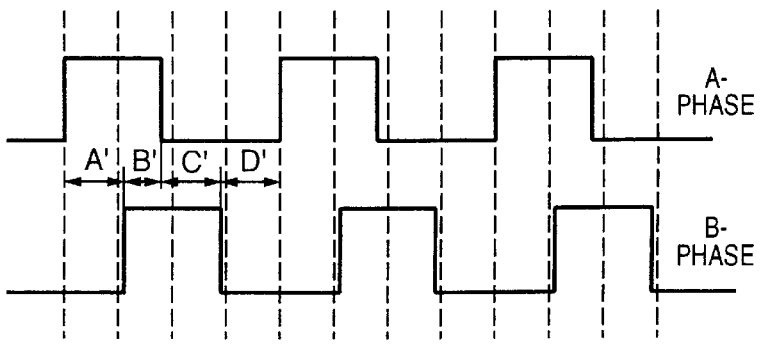

The CPU 46 responds to this speed information to supply a speed command value to the motor driver 48, controlling the drive source 21. This process will not be described since it is exactly the same as the control signal generating process in the prior art shown by the flowchart in FIG. 16.

Similarly, the process B, process C, process D, process A . . . are sequentially and periodically executed at timing T1-6, timing T1-7, timing T1-8, timing T1-9 . . . , respectively. By first using the leading edge of the encoder single-phase signal 44, or timing T1-1 as a start trigger it is possible to easily discriminate the intervals s, t, u and v. If the above processes are repeated, the drive source 21 can be controlled with reference to the composing circuit output 43 in the same way as in the case of using the encoder single-phase signal 44.

Thus, if the drive source 21 is driven during a predetermined period, for example, in the period in which the process A is executed a certain number of times while it is being controlled, the results of accumulating the count values s, t, u, and v in the intervals s, t, u and v can be obtained by the processes B, C, D and A. These accumulation results will be hereinafter referred to as "accumulation value s", "accumulation value t", "accumulation value u", and "accumulation value v".

The scatters of the duty ratio of each phase signal and phase difference between different phase signals from the encoder are peculiar to the encoder, and appear periodically in the above four intervals. Thus, if the accumulation values are obtained for the four intervals, the scatters can be completely grasped. In addition, if a certain length of the accumulation period is given, the effect of external factors on the control system becomes small. As a result, the ratios of accumulation value s, accumulation value t, accumulation value u and accumulation value v may be considered as information indicating the distance ratios of interval s, interval t, interval u and interval v, respectively.

The period of the leading edge of the encoder single-phase signal 44 is constant if the drive source 21 is ideally rotated, and the count value of the edge period is naturally constant. This can be determined by the target moving speed of the carriage 20, the deceleration ratio of the drive system, and the clock frequency for counting the edge period. It is assumed that the drive source is driven at the reference speed V when the carriage 20 is moved at a predetermined speed. At this time, if the leading edge period of the encoder single-phase signal 44 is 1 ms, and if the clock frequency for interval measurement is 8 MHz, the count value between the edges of the encoder single-phase signal 44 is theoretically 8000. This count value is a value that can be determined by design, and will be hereinafter referred to as "theoretical count value CNTA".

Finally, the first process is to find the theoretical count value for each interval, and to obtain a control target value for each interval.

A description will be made of a method for calculating the theoretical count value for each interval. The theoretical count value CNTA can be determined by design as described above. The ratios of accumulation values s, t, u and v may be regarded as the information indicating the distance ratios of the intervals s, t, u, and v, respectively. Thus, the average value of the accumulation values s, t, u, and v is calculated and designated by "CNTave". The theoretical count value CNTs for the interval s can be calculated by use of CNTave as in the following equation (4), the theoretical count value CNTt for the interval t as in the following equation (5), the theoretical count value CNTu for the interval u as in the following equation (6), and the theoretical count value CNTv for the interval v as in the following equation (7).

$$CNTs = CNTA \times (\text{accumulation value } s)/CNTave \quad (4)$$

$$CNTt = CNTA \times (\text{accumulation value } t)/CNTave \quad (5)$$

$$CNTu = CNTA \times (\text{accumulation value } u)/CNTave \quad (6)$$

$$CNTv = CNTA \times (\text{accumulation value } v)/CNTave \quad (7)$$

Here, if the speed conversion constant TRNV previously mentioned is used, the speed target value VELOs for the interval s can be expressed as in the following equation (8), the speed target value VELOt for the interval t as in the following equation (9), the speed target value VELOu for the interval u as in the following equation (10), and the speed target value VELOv for the interval v as in the following equation (11).

$$VELOs = TRNV/CNTs \quad (8)$$

$$VELOt = TRNV/CNTt \quad (9)$$

$$VELOu = TRNV/CNTu \quad (10)$$

$$VELOv = TRNV/CNTv \quad (11)$$

The calculated four speed target values for the respective intervals are stored in the work memory 50 as the control targets for the corresponding intervals.

Since the scatters of the duty ratio and phase difference between the phase signals from the encoder are peculiar to the encoder as described above, there is no change with time. Therefore, the first process may be executed, for example, immediately after the power supply to the apparatus is turned on. In addition, for example, the process can be executed once in the apparatus assembly process, and the control target value for each interval may be stored in the nonvolatile memory 49.

Figure 5:
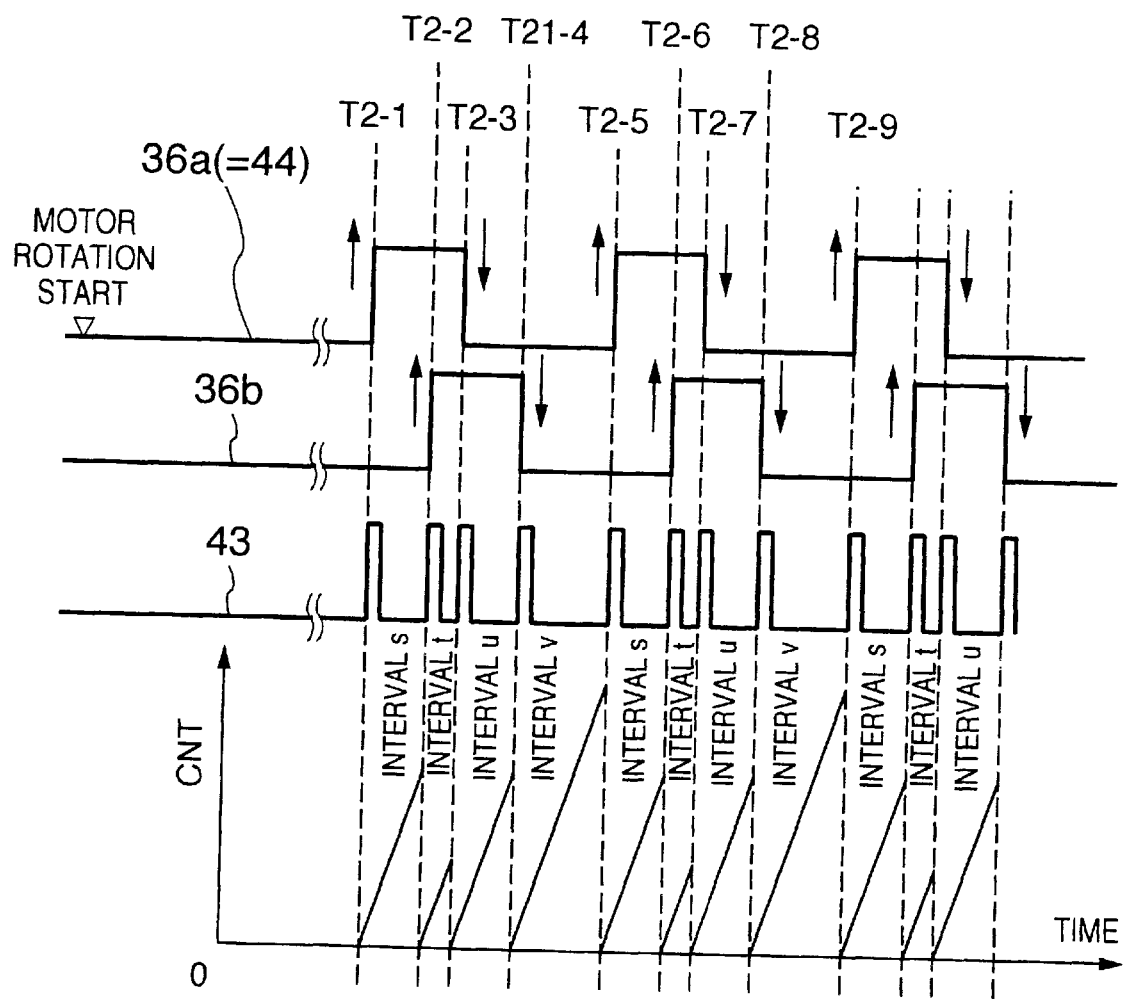
FIG. 5 is a timing chart showing a sequence of a second process according to the first embodiment.
Figure 6:
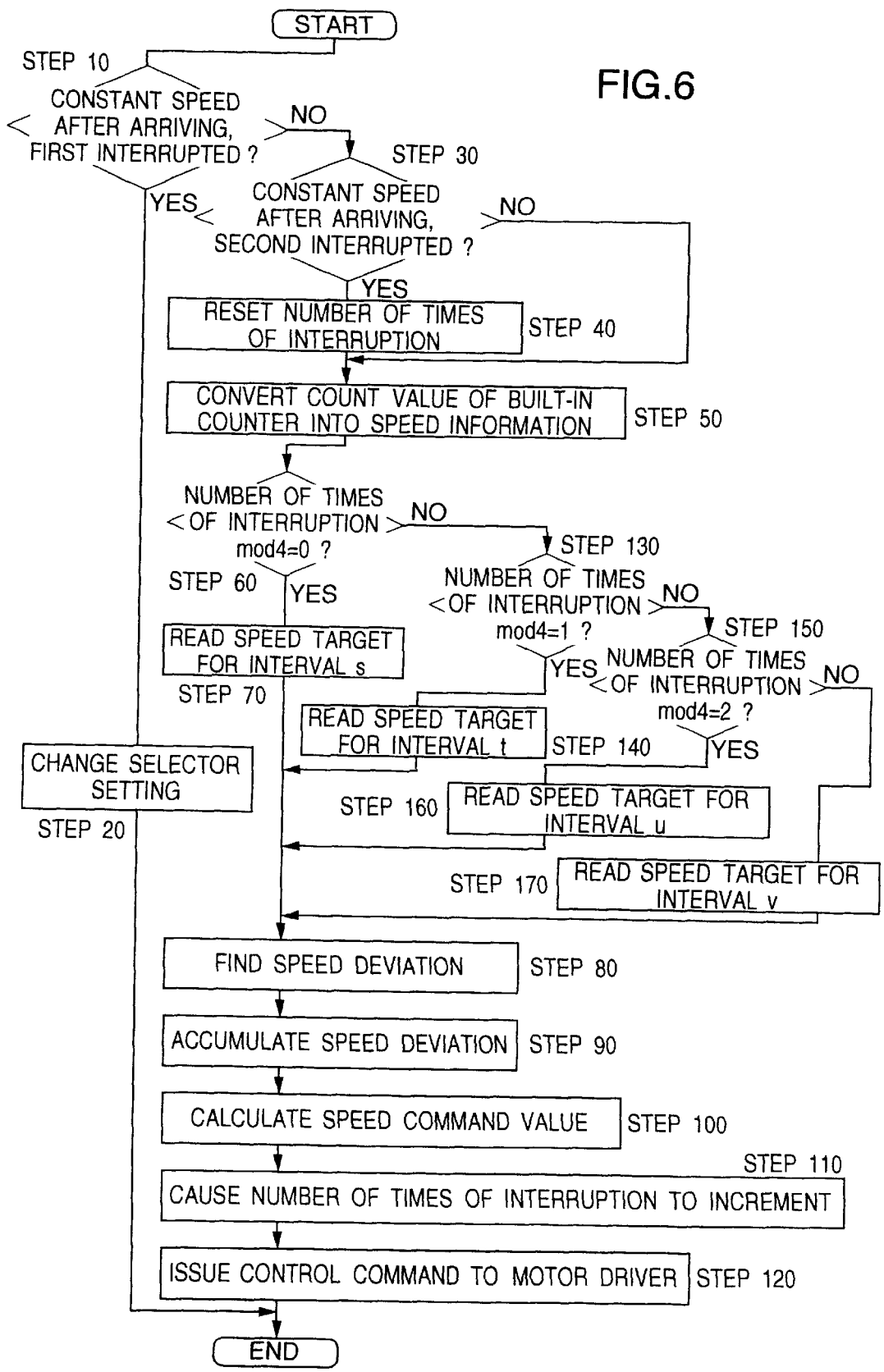
FIG. 6 is a flowchart of a control signal generating process.

With reference to FIGS. 3, 5 and 6, a description will be made of the second process in the present invention, or the process for controlling the drive source by use of the control target value for each interval that is calculated in the first process.

FIG. 5 is a timing chart showing the sequence of the second process in the first embodiment. FIG. 6 is a flowchart of the control signal generating process.

Before the rotation of the drive source 21 is started, the CPU 46 can read out from the nonvolatile memory 49 the control target value for each interval that is calculated in the first process, thereby copying it in the work memory 50. If the control target values have been already stored in the work memory 50, these can be immediately utilized. The CPU 46 sets the selector 45 so that the encoder single-phase signal 44 (=encoder A-phase signal) can be supplied to the CPU 46. Although the CPU 46 makes speed control on the drive source 21 under this condition, this process is exactly the same as in the prior art, and thus will not be described.

When the drive source 21 reaches a predetermined rotation speed, the CPU 46, by interruption, detects the leading edge timing T2-1 of the encoder single-phase signal 44 coming immediately thereafter (step 10). At this time, the CPU 46 changes the set condition of the selector 45 so that the edge composing circuit output 43 can be immediately supplied to the CPU 46 (step 20).

Since the other conditions of the CPU 46 are not changed, the built-in counter of the CPU 46 then counts the clock pulse generated from the clock generator 47 in the intervals s, t, u and v shown in FIG. 5. Each of the count value is copied in the built-in register (not shown). The count value will be hereinafter abbreviated "CNT".

When the CPU 46 detects the next leading edge timing T2-2 (step 30), the CPU 46 starts to count the number of times of interruption from this interruption as the start point (step 40). The count value CNT for the interval s has been already copied in the built-in register. The CPU 46 reads out this count value from the built-in register, and converts it into speed information VELO according to the following equation (12) (step 50).

$$VELO = (TRNV)/(CNT) \quad (12)$$

The number of times of interruption is divided by "4" and the remainder is found (step 60). Since the remainder is zero, the speed information VELOs for the interval s is selected (step 70).

The speed deviation e is found from the following equation (13) based on the speed information VELO obtained at step 50 (step 80).

$$(\text{speed deviation } e) = (\text{speed information } VELOe) - VELO \quad (13)$$

The speed deviation e obtained at step 80 is accumulated (integrated) to produce the distance deviation according to the following equation (14) (step 90).

$$(\text{distance deviation}) = \Sigma(\text{speed deviation } e) \quad (14)$$

The speed command value is calculated from the following equation (15) using the speed deviation e and distance deviation obtained at steps 80 and 90 (step 100).

$$(\text{speed command value}) = K\{(\text{speed deviation } e) + (\text{distance deviation})/T\} \quad (15)$$

The proportional integration control involves two coefficients K and T which are generally called proportional coefficient and integration coefficient, respectively. These coefficients depend upon hardware (motor, motor driver and so on) constituting the drive system, and can be determined by the analog simulation using for example SPICE and limited sensitivity method.

The number of times of interruption is forced to increment (step 110), and finally the CPU 46 supplies the speed command value to the motor driver 48, controlling the speed of drive source 21 (step 120).

When the CPU 46 detects the next leading edge timing T2-3, the step 40 is not executed because of the condition of the number of times of interruption (step 30). The count value CNT for the interval t is copied in the built-in register. The CPU 46 reads out this count value from the built-in register, and changes it into the speed information VELO according to the equation (12) (step 50).

The number of time of interruption is divided by "4" and the remainder is found (step 60). Since the remainder is "1" (step 130), the speed information VELOt for the interval s is selected (step 140).

The speed deviation e is calculated from the following equation (16) using the speed information VELO obtained at step 50 (step 80).

$$(\text{speed deviation } e) = (\text{speed information } VELOt) - VELO \quad (16)$$

The speed deviation e obtained at step 80 is accumulated (integrated) to produce the distance deviation according to the equation (14) (step 90).

The speed command value is calculated from the equation (15) using the speed deviation and distance deviation obtained at steps 80 and 90 (step 100).

The number of times of interruption is caused to increment (step 110), and finally the CPU 46 supplies the speed command value to the motor driver 48 (step 120).

When the CPU 46 detects the next leading edge timing T2-4, the step 40 is not executed because of the condition of the number of times of interruption (step 30). The count value CNT for the interval u is copied in the built-in register. The CPU 46 reads out this count value from the built-in register, and changes it into the speed information VELO according to the equation (12) (step 50).

The number of times of interruption is divided by "4" and the remainder is found (step 60). Since the remainder is "2" (step 150), the speed information VELOu for the interval u is selected (step 160).

The speed deviation e is calculated from the following equation (17) using the speed information VELO obtained at step 50 (step 80).

$$(\text{speed deviation } e) = (\text{speed information } VELOu) - VELO \quad (17)$$

The speed deviation e obtained at step 80 is accumulated (integrated), and the distance deviation is calculated from the equation (14) (step 90).

The speed command value is calculated from the equation (15) using the speed deviation and distance deviation obtained at steps 80 and 90 (step 100).

The number of times of interruption is caused to increment (step 110), and finally the CPU 46 supplies the speed command value to the motor driver 48 (step 120).

When the CPU 46 detects the next leading edge timing T2-5, the step 40 is not executed because of the condition of the number of times of interruption (step 30). The count value CNT for the interval v is copied in the built-in register. The CPU 46 reads out this count value from the built-in register, and changes it into the speed information VELO according to the equation (12) (step 50).

The number of times of interruption is divided by "4" and the remainder is found (step 60). Since the remainder is "3" (step 150), the speed information VELOv for the interval v is selected (step 170).

The speed deviation e is calculated from the following equation (18) using the speed information VELO obtained at step 50 (step 80).

$$(\text{speed deviation } e) = (\text{speed information } VELOv) - VELO \quad (18)$$

The speed deviation e obtained at step 80 is accumulated (integrated) to produce the distance deviation according to the equation (14) (step 90).

The speed command value is calculated from the equation (15) using the speed deviation and distance deviation obtained at steps 80 and 90 (step 100).

The number of times of interruption is forced to increment (step 110), and finally the CPU 46 supplies the speed command value to the motor driver 48 (step 120).

The above mentioned timings T2-2, T2-3, T2-4 and T2-5 are periodically repeated, and the drive source 21 is controlled in its speed.

Of the processes mentioned above, the process at step 70 is also able to refer to the count value of the built-in counter obtained at step 50. Therefore, at step 70, the count value for interval s can be always monitored. Similarly, at steps 140, 160 and 170, the count values for the intervals t, u and v can be monitored, respectively.

Thus, if the count value for the interval s is accumulated a specified number of times, and if this accumulation value is more than a predetermined value deviated from the theoretical count value for the interval s which is currently employed, the first process previously mentioned is again executed when the apparatus stands by, to thereby cope with the change of the duty ratio and phase difference of encoder with time when a trouble occurs.

In addition, if a control target value is written in a nonvolatile memory or the like of the apparatus at the time of assembling the apparatus, it is possible that when the duty ratio or phase difference of the encoder is changed with time, the nonvolatile memory content can be updated by writing a new measured value in the memory.

The case when the drive source is driven to ¼ the reference speed v is described above. A description will be made of the case when the drive source is driven to ½ the reference speed V.

When the drive source is driven to ¼ the reference speed V as described above, all the leading edges and trailing edges of each of the A-phase and B-phase signals from the encoder are detected, and the drive source is controlled on the basis of the measured values in those intervals (the both-phase and both-edge drive). When the drive source is driven to ½ the reference speed V, the leading edges and trailing edges of the A-phase signal are detected, and the drive source is controlled on the basis of the measured values in those intervals (a single-phase and both-edge drive).

Figure 7:
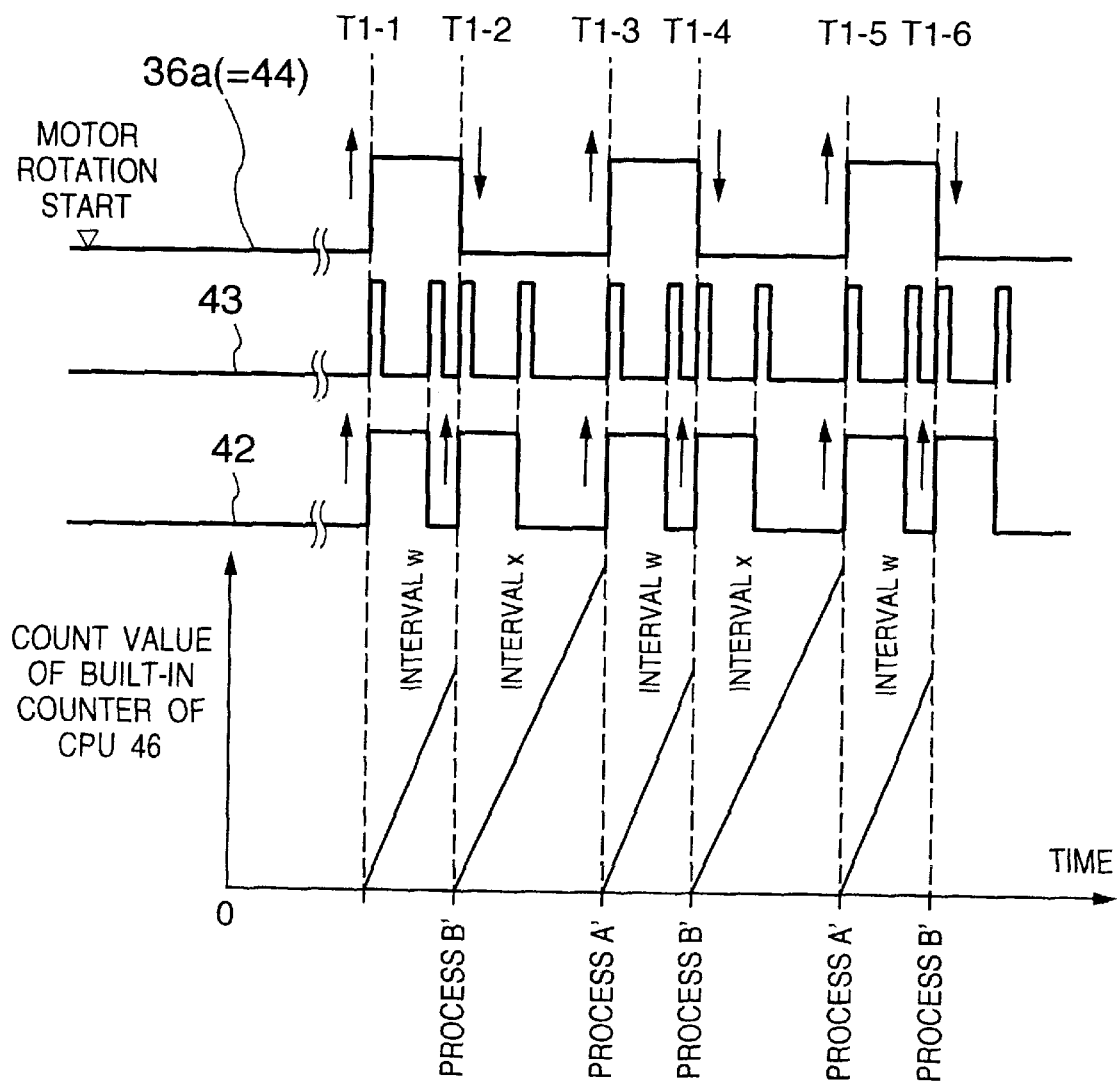
FIG. 7 is a timing chart showing a sequence of the first process for single-phase and both-side edge drive according to the first embodiment.

The operation will be described with reference to FIGS. 3 and 7. FIG. 7 is a timing chart showing the sequence of the first process of the single-phase and both-edge drive in the first embodiment.

Before the rotation of the drive source 21 is started, the CPU 46 sets the selector 45 so that the encoder single-phase signal 44 (=encoder A-phase signal) can be supplied to the CPU 46. In addition, the prescaler 41 is set to produce a divided-by-2 output.

The CPU 46 makes speed control on the drive source under this condition. This process is exactly the same as in the prior art, and thus will not be described. Also, at this time, the drive speed of the drive source is equal to the speed to which the drive source is driven by referring, for example, only to the leading edges of A-phase signal. This speed corresponds to the reference speed V in the prior art as mentioned above.

When the drive source 21 arrives at a predetermined rotation speed, the CPU 46, by interruption, detects the immediately succeeding leading edge timing T'1-1 of the encoder single-phase signal 44, and immediately changes the set condition of the selector 45 so that the prescaler output 42 can be supplied to the CPU 46. Since the composing circuit output 43 for both-side edges of A-phase and B-phase signals is supplied to the prescaler 41, the prescaler output 42 corresponds to the composing circuit output 43 of which the frequency is divided by "2". In addition, the prescaler 41 refers directly to the A-phase signal (not shown) to synchronize the leading edges of the frequency-divided output and the leading edges of the A-phase signal. Moreover, the CPU 46 clears two interval accumulation values into zero, which are variables given on the work memory and which software manages.

Since the other conditions of the CPU 46 are not changed, the built-in counter of the CPU 46 counts in the intervals w and x the clock pulse generated from the clock generator 47. The count values are copied in the built-in register (not shown).

When the CPU 46 detects the next leading edge timing T'1-2, the count value for the interval w has been already copied in the built-in register. The CPU 46 reads out this count value from the built-in register, and stores it as count value w in the work memory 50. At the same time, it is added to the interval accumulation value corresponding to the interval w. This process will be hereinafter referred to as "process B'".

When the CPU 46 detects the next leading edge timing T'1-3, the count value for the interval x has been already copied in the built-in register, and the CPU 46 reads out this count value from the built-in register, and stores it as count value x in the work memory 50. At the same time, it is added to the interval accumulation value corresponding to the interval x. In addition, the count value w and the count value x both of which are stored in the work memory 50 are added. The added result is equivalent to the count value obtained considering only the leading edge interval of the encoder single-phase signal 44.

The encoder single-phase signal 44 is a signal indicating "distance" that is generated each time the drive source is rotated by a predetermined angle. In addition, since the result of adding the count values of the clock signal for each interval indicates "time", the CPU 46 can obtain the speed information of the drive source 21 by calculating the "distance" divided by the "time". Since the encoder generally reproduces the same edge interval of the same phase signal constantly with very high precision, the edge interval (i.e. "distance") is considered to be constant. A predetermined constant (hereinafter, called "speed conversion constant TRNV") is defined, and divided by the result of adding the count value w and the count value x to produce the speed information. This process will be hereinafter referred to as "process A'".

The CPU 46 supplies a speed command value to the motor driver 48 on the basis of this speed information, controlling the drive source 21. This process is exactly the same as the control signal generating process in the prior art as shown by the flowchart in FIG. 16, and thus will not be described.

Similarly, the process B' is executed at the timing T'1-3, the process A' at the timing T'-4 . . . sequentially and periodically. First, by using the leading edge of the encoder single-phase signal 44, or timing T'1-1 as a start trigger, it is possible to easily discriminate the intervals w and x. If the above processes are repeated, the drive source 21 can be controlled with reference to the composing circuit output 43 exactly in the same was as when the encoder single-phase signal 44 is used.

Thus, if the drive source 21 is driven in a predetermined period, for example, in the period in which the process A' is executed in a certain number of times while the drive source 21 is being controlled, the results of accumulating the count value w for the interval w and the count value x for the interval x can be obtained by the above process B' and process A'. This accumulated results will be hereinafter referred to as "accumulation value w" and "accumulation value x".

The scatter of the duty ratio of the single-phase signal from the encoder is peculiar to the encoder, and appears periodically in the above two intervals. Thus, if the accumulation values in the two intervals are obtained, the state of the scatter can be completely grasped. In addition, the effect of the external factors on the control system is reduced by giving a certain length of accumulation period, and as a result the ratio of the accumulation values w and x may be considered as information indicating the ratio of the distances of the intervals w and x.

On the other hand, the period of the leading edge of the encoder single-phase signal 44 becomes constant if the drive source 21 is ideally rotated, and the count value of the edge period is also naturally constant. This can be previously determined from the target moving speed of the carriage 20, the deceleration ratio of the drive system and the frequency of the clock for use in counting the edge period. It is assumed that if the carriage 20 is driven at a predetermined speed, the drive source is driven at the standard speed V. At this time, if the period of the leading edge of the encoder single-phase signal 44 is 1 ms, and if the clock frequency for the interval measurement is 8 MHz, the count value between the edges of the encoder single-phase signal 44 is theoretically 8000. This count value is a value that can be determined by design, and will hereinafter be called "theoretical count value" and represented by "CNTA'".

Finally the first process is to determine the theoretical count value in each interval and to obtain the control target value for each interval from the theoretical count value.

A description will be made of a method for determining the theoretical count value in each interval. The theoretical count value CNTA' can be determined by design as described above. In addition, the ratio of the accumulation values w and x can be considered as information indicating the distance ratio of the intervals w and x. Thus, the average value of the accumulation values w and x is first calculated and represented by CNTave'. The theoretical count value CNTw for the interval w can be calculated from the following equation (19) using CNTave', and the theoretical count value CNTx for the interval x from the following equation (20).

$$CNTw = CNTA' \times (\text{accumulation value } w)/CNTave' \quad (19)$$

$$CNTt = CNTA' \times (\text{accumulation value } x)/CNTave' \quad (20)$$

Here, the speed target value VELOw for the interval w can be expressed by the following equation (21) using the above-mentioned speed conversion constant TRNV', and the speed target value VELOx for the interval x by the following equation (22).

$$VELOw = TRNV'/CNTw \quad (21)$$

$$VELOx = TRNV'/CNTx \quad (22)$$

The two speed target values for the respective intervals are stored as control targets for the corresponding intervals in the work memory 50.

Since the scatter of the duty ratio of the single-phase signal from the encoder is peculiar to the encoder as described above, there is no change with time. Therefore, the first process may be executed for example immediately after the power supply to the apparatus is turned on. In addition, for example, the first process may be executed once when the apparatus is assembled, and the control target value for each interval may be stored in the nonvolatile memory 49.

Figure 8:
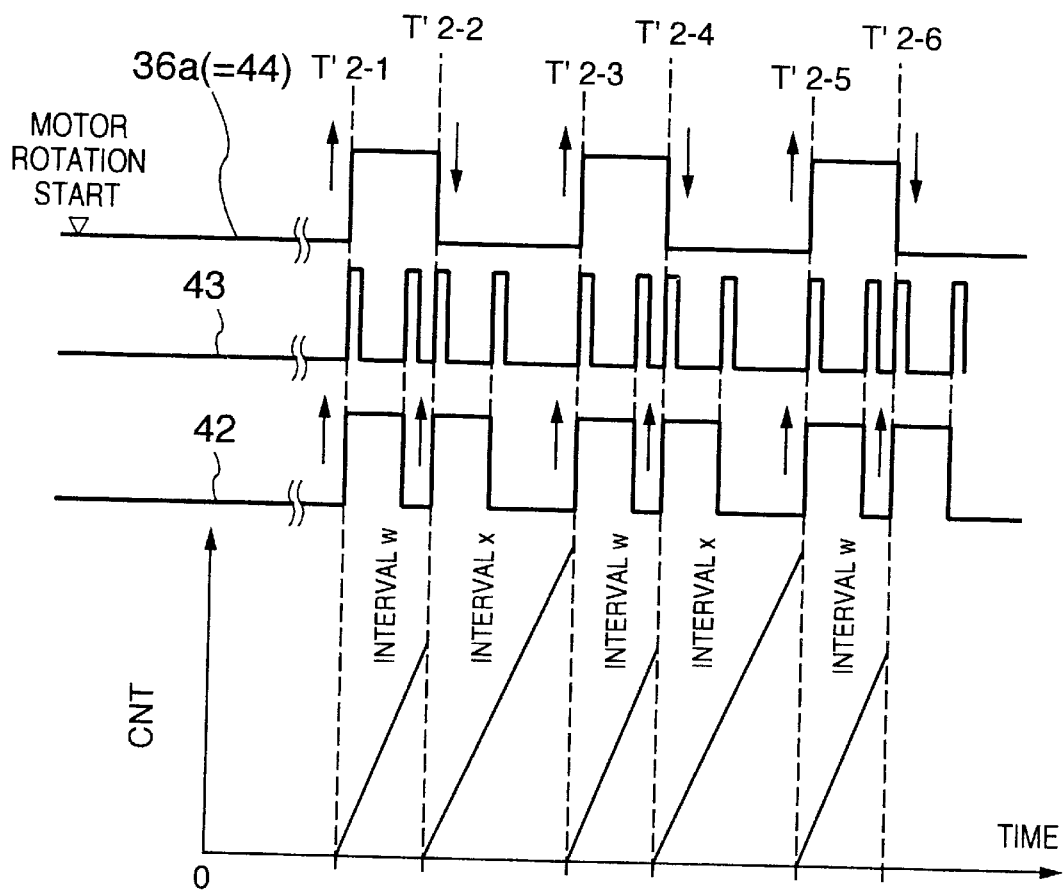
FIG. 8 is a timing chart showing a sequence of the second process at the drive speed of ½ the reference speed V according to the first embodiment.
Figure 9:
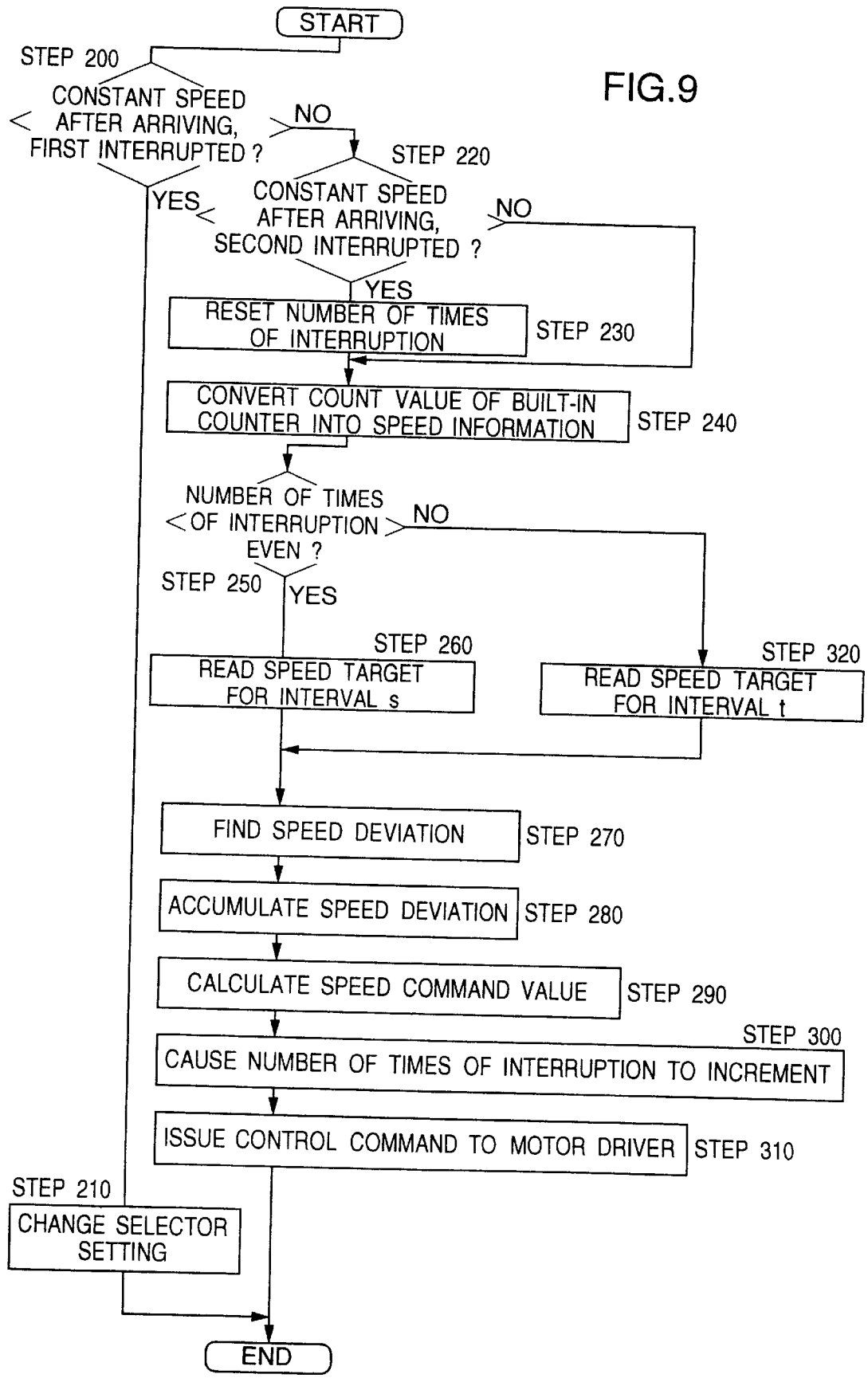
FIG. 9 is a flowchart of the control signal generating process of the second process at the drive speed of ½ the reference speed V according to the first embodiment.

With reference to FIGS. 3, 8 and 9, a description will be made of the second process in the case where the drive speed is ½ the reference speed V, or the process in which the drive source is controlled by use of the control target value for each interval that is obtained in the first process.

FIG. 8 is a timing chart showing the sequence of the second process in which the drive speed is ½ the reference speed V in the first embodiment. FIG. 9 is a flowchart of the control signal generating process of the second process in which the drive speed is ½ the reference speed V in the first embodiment.

Before the rotation of the drive source 21 is started, the CPU 46 can also read out from the nonvolatile memory 49 the control target value for each interval that is obtained in the first process, and copy it in the work memory 50. If the control target values have been already stored in the work memory 50, they can be used directly.

The CPU 46 sets the selector 45 so that the encoder single-phase signal 44 (=encoder A-phase signal) can be supplied to the CPU 46. The CPU 46 makes speed control on the drive source 21 under this state. This process is exactly the same as in the prior art, and thus will not be described.

When the drive source 21 arrives at a predetermined rotation speed, the CPU 46, by interruption, detects the leading edge timing T'2-1 of the immediately succeeding encoder single-phase signal 44 (step 200). The set condition of the selector 45 is immediately changed so that the prescaler output 42 can be supplied to the CPU 46 (step 210). Since the composing circuit output 43 of both-side edges of A-phase and B-phase signals is supplied to the prescaler 41, the prescaler output 42 is the composing circuit output 43 divided in frequency by "2". The prescaler 41 refers directly to A-phase signal (not shown) to synchronize the leading edge of the frequency-divided output and the leading edge of the A-phase signal.

Since the other conditions of CPU 46 are not changed, the built-in counter of the CPU 46 counts the clock pulse generated from the clock generator 47 in the intervals w and x shown in FIG. 8. The count values are copied in the built-in register (not shown). These values will hereinafter be abbreviated "CNT".

When the CPU 46 detects the leading edge timing T'2-2 (step 220), the CPU 46 starts to count the number of times of interruption from the start point of this interruption (step 230). Since the count value CNT' for the interval w has been already copied in the built-in register, the CPU 46 reads out this count value from the built-in register, and converts it into speed information VELO' according to the following equation (23) (step 240).

$$VELO' = TRNV'/CNT' \quad (23)$$

It is decided if the number of times of interruption is odd or even (step 250). Since it is even, the speed information VELOw for the interval w is selected (step 260).

The speed deviation e' is determined from the following equation (24) using the speed information VELO' obtained at step 240 (step 270).

$$\text{(speed deviation } e') = \text{(speed information } VELOw) - VELO' \quad (24)$$

The speed deviation e' obtained at step 270 is accumulated (integrated), and the distance deviation is calculated according to the following equation (25) (step 280).

$$\text{(distance deviation)} = \Sigma \text{(speed deviation } e') \quad (25)$$

The speed command value is calculated from the equation (15) using the speed deviation and distance deviation obtained at steps 270 and 280 (step 290).

The number of times of interruption is caused to increment (step 300), and finally the CPU 46 supplies the speed command value to the motor driver 48, controlling the speed of the drive source 21 (step 310).

When the CPU 46 detects the next leading edge timing T'2-3, the step 230 is not executed because of the condition of the number of times of interruption (step 220). Since the count value CNT' for the interval x has been already copied in the built-in register, the CPU 46 reads out this count value from the built-in register, and converts it into speed information VELO' according to the equation (23) (step 240).

It is decided if the number of times of interruption is odd or even (step 250). Since it is odd, the speed information VELOx for the interval x is selected (step 320).

The speed deviation e' is calculated from the following equation (26) using the speed information VELO' obtained at step 240 (step 270).

$$\text{(speed deviation } e') = \text{(speed information } VELOx) - VELO' \quad (26)$$

The speed deviation e' obtained at step 270 is accumulated (integrated), and the distance deviation is calculated from the equation (22) (step 280).

The speed command value is calculated from the equation (15) by use of the speed deviation and the distance deviation obtained at step 270 and step 280 (step 290).

The number of times of interruption is forced to increment (step 300). Finally, the CPU 46 supplies the speed command value to the motor driver 48 (step 310).

The timing T'2-2 and timing T'2-3 mentioned above are periodically repeated, and the drive source 21 is controlled in its speed.

Of the above-mentioned processes, the process at step 260 can also refer to the count value of the built-in counter obtained at step SP 240. Therefore, at step 260, the count value for the interval w can be always monitored. Similarly, at step SP320, the count value for the interval x can be monitored.

Thus, for example, the count value for the interval w is accumulated a specified number of times. If this accumulation value is deviated more than a predetermined rate from the currently used theoretical count value for the interval w, the first process previously mentioned is again executed when the apparatus stands by or at other time, so as to cope with the change of the duty ratio of the encoder with time which is caused by any trouble.

In addition, if the control target value is written in advance in the nonvolatile memory when the apparatus is assembled, the count value of the nonvolatile memory can be updated by supplying a new measured value when the duty ratio of the encoder is changed with time.

Second Embodiment

A second embodiment of the present invention will be described with reference to the drawings. The second embodiment is the application of the present invention to an image forming apparatus, or more specifically an electronic photographing apparatus.

A conventional electronic photographing apparatus will be described below. Chiefly the so-called intermediate transferred body type electronic photographing apparatus will be mentioned, in which a latent image formed on a photosensitive material by a laser beam or other means is developed by a developing apparatus for each color, and the developed monochrome images are once transferred onto an image forming medium called an intermediate transferred body so as to be composed, and then all are transferred onto a sheet of paper.

Figure 10:
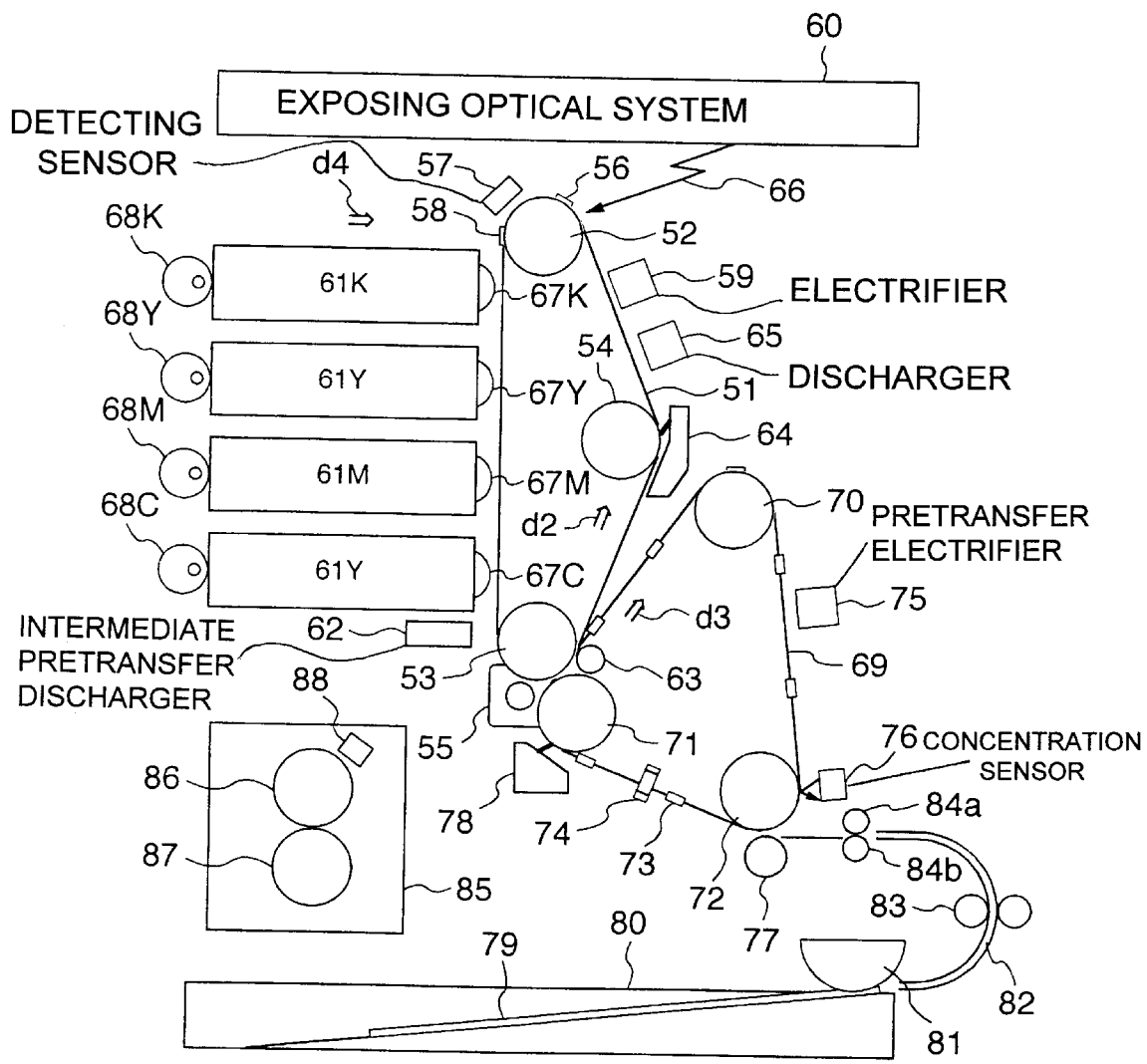
FIG. 10 shows the whole arrangement of an electronic photographing apparatus to which the drive source controlling method of the present invention is applied.

FIG. 10 is a diagram showing the whole construction of the electronic photographing apparatus employing the drive source controlling method of the present invention.

Referring to FIG. 10, there is shown a photosensitive body 51 of a loop belt shape, which is composed of a PET base, an aluminum-evaporated layer, an electric charge generating layer (CGL), and a charge transporting layer (CTL). The photosensitive body 51 is supported by three photosensitive body carrying rollers 52, 53 and 54. A drive source 55 is a DC motor. The drive source 55 is constructed to be integral with the encoder. Each time the drive source 55 is rotated by a predetermined amount, the encoder produces a single-phase pulse signal. When the drive source 55 is rotated, the photosensitive body 51 is moved round in a drive direction d2. A mark 56 is for detecting the position of the photosensitive body 51. The mark 56 is disposed at the end of the photosensitive body 51. A photosensitive body position detecting sensor 57 is for detecting the photosensitive body position detecting mark 56. The photosensitive body 51 has a junction 58. An image is required to be formed on an area not including the junction 58. The junction 58 can be avoided by referring to the output from the photosensitive body position detecting sensor 57.

Along the photosensitive body 51, there are sequentially provided in the rotation direction d2 an electrifier 59, an exposing optical system 60, developing devices 61K, 61Y, 61M and 61C for black (K), yellow (Y), Magenta (M) and cyan (C), an intermediate pretransfer discharger 62, an intermediate transfer roller 63, a photosensitive body cleaner 64, and a discharger 65.

The electrifier 59 is composed by an electrifying wire made of tungsten wire or the like, a shield plate made of a metal plate and a grid plate and so on (not shown). When a negative high voltage is applied to the electrifying wire, it causes corona discharge. When a voltage of, for example, –700 V is applied to the grid plate, the surface of the photosensitive body 51 is uniformly electrified to have a negative potential of about –700 V.

The exposing optical system 60 is composed by a laser driver, a polygon mirror, a lens system, a polygon mirror rotating motor (scanner motor) and so on(not shown). The exposing optical system 60 forms an electrostatic latent image on the electrified photosensitive body 51. An exposing light ray 60 is irradiated from the exposing optical system 60. The exposing light ray 66 can be obtained by pulse-width modulation of an image signal from, for example, a gradation converting circuit (not shown) on a laser beam in a laser drive circuit (not shown). This ray is used to form an electrostatic latent image corresponding to image data of a particular color on the photosensitive body 51.

Developing device 61K, 61Y, 61M and 61C have black toner, yellow toner, Magenta toner and cyan toner, respectively. The color developing device also have sleeve rollers 67K, 67C, 67M and 67Y made of conductive rubber or the like, respectively. When the sleeve roller is rotated in the forward direction, or in the drive direction d2 of the photosensitive body 51, the toner is fed from within the developing device onto the surface of the sleeve roller in a form of thin film. When fed in a thin layer, the toner is electrified to have a negative potential by friction. Each color development is performed by applying a negative voltage (developing bias) to the sleeve roller, rotating the sleeve roller, driving a motor (not shown) exclusive for each of color cams 68K, 68Y, 68M and 68C, moving a selected developing device, for example, the black developing device 61K in the direction d4, and making the sleeve roller 67K in contact with the photosensitive body 51. The present embodiment employs contact phenomenon using nonmagnetic one-component toner.

The surface potential (bright potential) of the photosensitive body 51 at the latent-image formed region is raised to about –50 to –100 V. An electric field is produced in the direction of the sleeve roller 67 from the photosensitive body 51 by applying a negative potential of about –300 V to the sleeve roller 67. As a result, Coulomb force is exerted on the negatively charged toner on the sleeve roller in the direction opposite to the electric field, or in the direction of the photosensitive body 51. The toner is attached on the latent image portion formed on the photosensitive body 51. On the other hand, since the surface potential (dark potential) of the photosensitive body 51 at the region on which no latent image is formed is –700 V, the electric field is produced in the direction of the photosensitive belt 51 from the sleeve roller 67 even when the developing bias is applied, and thus the toner is not attached on the photosensitive body 51. The above-mentioned phenomenon process is generally referred to as "negative positive process" or "inversion process" because toner (black) is attached on the irradiated portion (white).

The intermediate pretransfer discharger 62 has a plurality of red LEDs disposed on a line, and makes the surface of the photosensitive body 51 be discharged immediately before the toner image formed on the photosensitive body 51 is transferred to the intermediate transferred body 69 which is a medium on which the respective color images are composed. The intermediate pretransfer discharger 62 fundamentally does not operate when the first color image is transferred, but operates when the second color image is transferred. The discharge before transfer has an effect to prevent the toner image on the intermediate transferred body 69 from being reversely transferred to the photosensitive body 51 when the toner image is transferred to the intermediate transferred body 69 and when no toner is present on the photosensitive body 51.

The mechanism of the reverse transfer generation will be described below. When a toner image is present on the intermediate transferred body 69 and when no toner is present on the photosensitive body 51, the toner on the intermediate transferred body 69 is exposed to an excessive electric field due to the transfer bias by the intermediate transfer roller 63 which will be described later, and to the surface potential of the photosensitive body 51. Thus, the true charge of the toner is removed, or the so-called charge injection is generated, so that van der Waals force is dominant between the toner and the photosensitive body 51. As a result, the toner is reversely transferred to the photosensitive body 51, and reversely electrified toner (positively charged toner) is generated. Thus, the toner image is reversely transferred to the photosensitive body 51 by Coulomb force.

When charge is removed before transfer, that portion of photosensitive body 51 on which no toner is present has bright potential, and thus an excessive electric field is not acted on the toner so that the reverse transfer can be effectively prevented. However, when the charge removing action is too large, the potential barrier is lost from the portion which has no toner around the dots, and hence the force to restrict the toner in the surface direction of the photosensitive body 51 is decreased. Thus, dots are scattered when transferred. Therefore, it is necessary that the amount of emission of the pretransfer discharger be controlled enough.

The intermediate transfer roller 63 is a metal roller which is disposed near the photosensitive body support roller 53, and made in contact with the inside of the intermediate transferred body 69. This metal roller is disposed to oppose the photosensitive body 51 with the intermediate transferred body 69 interposed therebetween. The aluminum-evaporated layer of the photosensitive body 51 is grounded, and hence when a positive voltage is applied to the intermediate transfer roller 63, an electric field is produced from the intermediate transfer roller 63 to the photosensitive body 51. Thus, Coulomb force is exerted on the negatively charged toner on the photosensitive body 51 in the direction of the intermediate transferred body 69, so that the toner is transferred to the intermediate transferred body 69.

The photosensitive body cleaner 64 is disposed to oppose the photosensitive body supporting roller 54 with the photosensitive body 51 interposed therebetween. This cleaner removes the residual toner left on the photosensitive body 51 after the toner is transferred from the photosensitive body 51 to the intermediate transferred body 69. The junction 58 of the photosensitive body 51 is sloped about 3° to 5° to the scanning direction of the exposing light ray 66, so as to prevent the image from being disturbed by a shock caused when the junction 58 passes by the photosensitive body cleaner 64. The photosensitive body cleaner 64 has no mechanism to make it separate from and in contact with the photosensitive body 51.

The discharger 65 has a plurality of red LEDs disposed on a line to remove the residual potential on the photosensitive body 51.

The construction of the peripheral portion around the intermediate transferred body will be described below.

The intermediate transferred body 69 is a loop-shaped belt which is made of a conductive resin and so on, and has no junction. The body is a medium on which a full color image is formed by composing the monochrome images. The intermediate transferred body 69 is supported by three carrying rollers 70, 71 and 72, and moved round in a direction d3 by the same drive source 55 as for the photosensitive body 51. Marks 73 is for detecting the position of the intermediate transferred body. The number of the marks 73 is "8", and the marks 73 are disposed on the side of the intermediate transferred body 69. An intermediate transferred body position sensor 74 is for detecting the marks 73. When an image is formed, one is selected from the plurality of intermediate transferred body position detecting marks 73, and used as a reference position for an image forming position.

A description will be made of a method of deciding the image forming reference. In the electronic photographing apparatus constructed as in FIG. 10, the lengths of the photosensitive body 51 and intermediate transferred body 69 are designed to be equal. However, since the lengths are not exactly equal, the rotation periods are different. If the photosensitive body position detecting mark 56 is matched to the image forming reference, the toner image is always formed at the same position on the photosensitive body 51, but the toner images of different colors superimposed on each other on the intermediate transferred body 69 are shifted in position, or not precisely aligned. When the image forming reference is applied to the intermediate transferred body 69, the position at which the image is formed on the photosensitive body 51 is gradually shifted according to the length difference, but the composed image is formed at the same position on the intermediate transferred body 69. Therefore, the image forming reference is required to be applied to the intermediate transferred body 69. Here, since the photosensitive body 51 has the junction 58 on which the toner image cannot be formed, the image forming operation cannot be sometimes performed even though a proper image forming position is found on the intermediate transferred body 69.

Thus, the plurality of marks 73 are provided on the side of the intermediate transferred body 69, the mark 73 just before the detection of the mark 56 is selected as the image forming reference. In addition, after the mark 73 just before the detection of the mark 56 is detected, the lapse time until the mark 56 is detected is measured as phase difference time. Then, all the image forming processes are delayed by this phase difference time after the selected mark 73 is detected.

Although only one position detection mark 73 may be provided on a primary basis, a plurality of marks 73 are actually provided on the intermediate transferred body 69, so that the image forming operation can be fast started after the mark detection, because the first page is printed late depending on the positional relation between the bodies 51 and 69, it takes a long time to start the image forming operation from when the mark 73 is detected, and the image alignment precision on the body 69 will be reduced.

Along the surface of the intermediate transferred body 69, there are disposed in the rotation direction d3 a pretransfer electrifier 75, a concentration sensor 76, a paper transfer roller 77, and an intermediate transferred body cleaner 78.

The pretransfer electrifier 75 is a corotron charger that is made of a shield plate (not shown) composed by an electrifying wire of tungsten wire or the like and a metal plate. When a negative high voltage is applied to the electrifying wire, the electrifying wire causes corona discharge, forcibly recharging the toner image composed on the intermediate transferred body 69. The pretransfer electrifier 75 is actuated immediately before an image is transferred on a sheet of recording paper 79, and acts only on the image region on the intermediate transferred body 69, but stopped during the other periods. The pretransfer electrifying improves the mechanical margin at the time of transfer on paper and the characteristics against the environment.

The concentration sensor 76 is an application of reflection type sensor, and detects the toner concentration on the intermediate transferred body 69. The emission side of the concentration sensor 76 is connected to a D/A converter (not shown). The amount of emission of the sensor can be changed by setting data in the A/D converter and controlling the current. The output from the light receiving side of the sensor is amplified by an operational amplifier (not shown) or the like, and supplied to the A/D conversion port (not shown) of CPU.

The paper transfer roller 77 is composed by a central shaft of metal, and a material of expanded silicon or conductive polyurethane rubber. When the toner image composed on the intermediate transferred body 69 is transferred to the recording paper, the paper transfer roller is rotated in contact with the body 69. Since the image is deteriorated if the paper transfer roller 77 is contaminated with toner or the like, a cleaning mechanism (not shown) is provided near the roller.

The intermediate transferred body cleaner 78 removes the residual toner left on the intermediate transferred body 69 after the transfer to the paper. While the toner image is being composed on the intermediate transferred body 69, the cleaner is separated from the body 69. It is made in contact with the body 69 only when cleaning is made.

The constructions of the paper supply system and fixing apparatus will be described below.

The paper supply system is composed by a recording paper cassette 80, a paper supply roller 81, a paper carrying path 82, a slip roller 83, a resist roller 84a and a slave roller 84b to that roller.

The recording paper cassette 80 is a cassette which houses recording paper. Around the cassette, there are provided a recording paper cassette detecting sensor, a recording paper size discriminating sensor, a recording paper detecting sensor, a residual recording paper sensor and so on (all not shown).

The paper supply roller 81 is a semicircular roller, and feeds the recording paper 79 sheet by sheet from the recording paper cassette 80 to the paper carrying path 82.

The slip roller 83 is disposed along the paper carrying path 82. The recording paper 79 picked up by the paper supply roller 81 is carried to the resist roller 84a by the slip roller 83. When the tip of the recording paper 79 reaches the resist roller 84a, the resist roller 84a is not rotated yet, and thus the recording paper 79 cannot be advanced, and stays stopped at the position of the slip roller 83.

The resist roller 84a and the slave roller 84b temporarily stop the recording paper 79 in the stand-by mode so that the composed image on the intermediate transferred body 69 can be aligned with the position of the recording paper 79. In operation, both rollers are rotated to carry the recording paper 79 in the direction of the paper transfer roller 77.

The construction of the fixing apparatus 85 will now be described.

The fixing apparatus 85 is formed of a heat roller 86, a pressing roller 87, a temperature sensor 88 and so on.

The heat roller 85 is composed by a heater, a core made of aluminum, and a silicone rubber body of about 0.5 mm in thickness. This roller heats the surface of the toner image transferred on a recording paper 88, thereby softening and fusing the toner.

The pressing roller 87 is composed by a shaft made of iron, and a silicone rubber body of about 3 mm in thickness. This roller presses the recording paper 79 against the heating roller 86. When the recording paper 79 is pressed between the heat roller 86 and the pressing roller 87 and rotated, the toner image on the recording paper 79 is fixed as a color image on the recording paper by heating and pressing.

The temperature sensor 88 is such as a thermistor, detects the surface temperature of the heat roller 86. The output from the temperature sensor 88 is detected with a proper sampling period. The amount of heating per unit time is controlled on the basis of the detected result so that the heat roller can be always maintained at a specified temperature.

In the image forming apparatus, when an image is formed, the photosensitive body 51 is moved in the direction d2, and the intermediate transferred body 69 is moved in the direction d3, or both bodies are always rotated in the same direction. Therefore, since the drive source 55 may be always rotated in the same direction, there is no need to detect a plurality of directions for speed control unlike the image reading apparatus in the first embodiment previously mentioned.

Thus, the encoder used in the image forming apparatus of the type mentioned above is almost, for example, the type in which a single-phase pattern magnetically recorded on the outer periphery of the rotor of the drive source 55 is detected by a magnetic detector to produce a single-phase signal. In other words, this type is often integrally constructed by the encoder and the drive source.

There is known a method of forming an image in such a manner that in order to improve the picture quality the pixel density is doubled both in the photosensitive body 51 moving direction (sub-scanning direction) and in the vertical direction (main scanning direction) to that direction. This double density can be achieved by reducing the moving speeds of the bodies 51 and 69 to ½ as low, and by doubling the number of pixels to be recorded in one scanning period by the exposing optical system 60. At this time, it is necessary to drive the drive source precisely at ½ the reference speed V.

Figure 11:
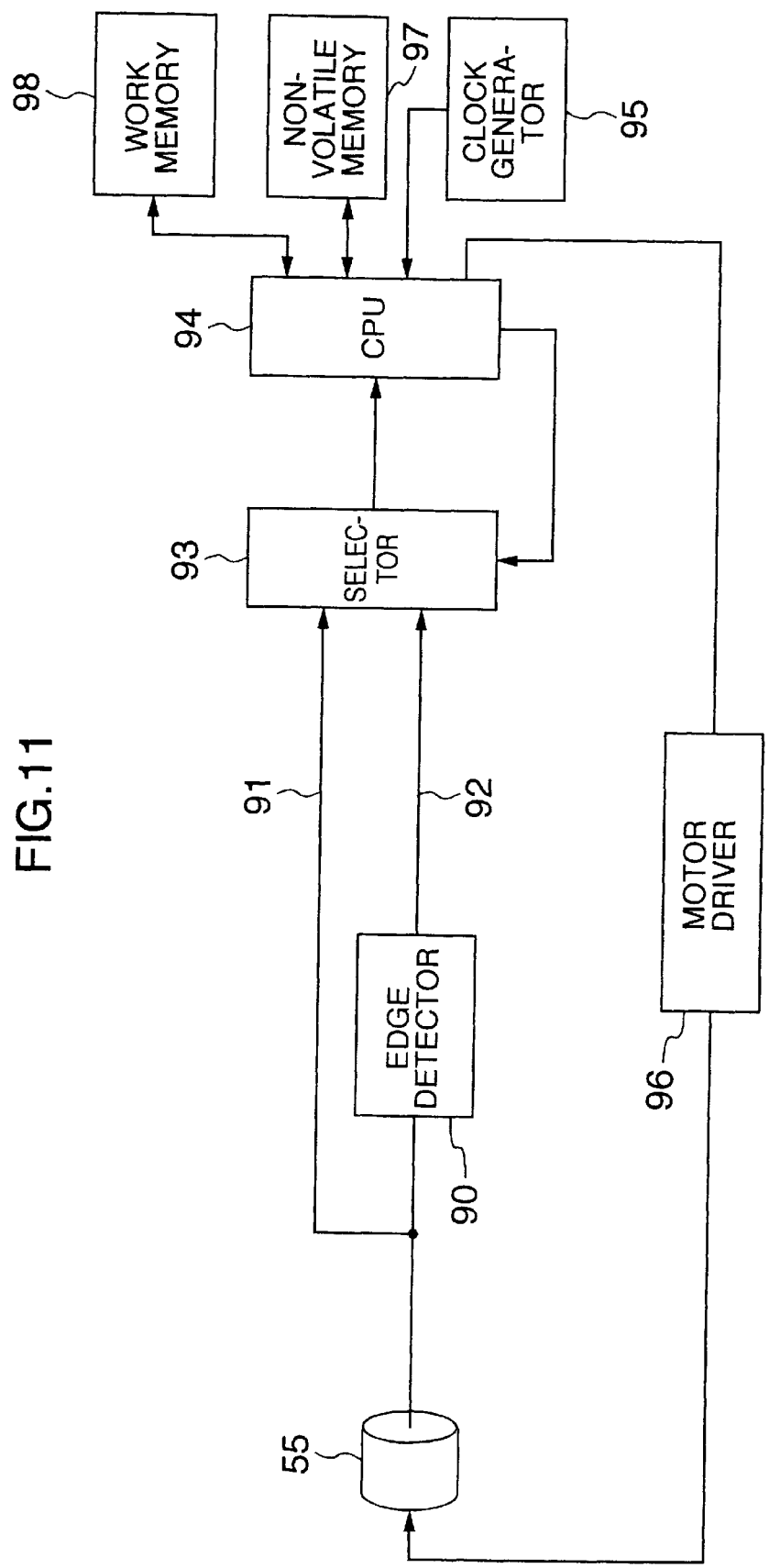
FIG. 11 is a block diagram showing the construction of a drive source controlling method according to a second embodiment.

FIG. 11 is a block diagram of the construction for realizing the drive source controlling method according to the second embodiment. In FIG. 11, there is shown the drive source 55 which is previously mentioned. Each time this drive source is rotated a predetermined amount, the encoder integrally constructed with the drive source produces a single-phase pulse signal. An edge detector 90 detects the leading edges and trailing edges of the single-phase signal, and produces a pulse output. There are also shown an encoder output signal 91, an edge detected output 92, and a selector 93 for selecting one of the encoder output signal 91 and the edge detected output 92. There are further shown a central processing unit (hereinafter, abbreviated "CPU") 94, a clock generator 95 for generating a clock signal to the CPU 94, a motor driver 96 for controlling the rotation speed of the drive source 55 on the basis of a control signal from the CPU 94, a nonvolatile memory 97 for transmitting and receiving data to and from the CPU 94 by, for example, serial communication, and a work memory 98 for providing a work region to the CPU 94.

A description will be made of a method of driving the drive source at ½ the reference speed V on the basis of the measured interval value after detecting the leading edge and trailing edge of the single-phase signal from the encoder (the single-phase and both-side edge drive).

Figure 12:
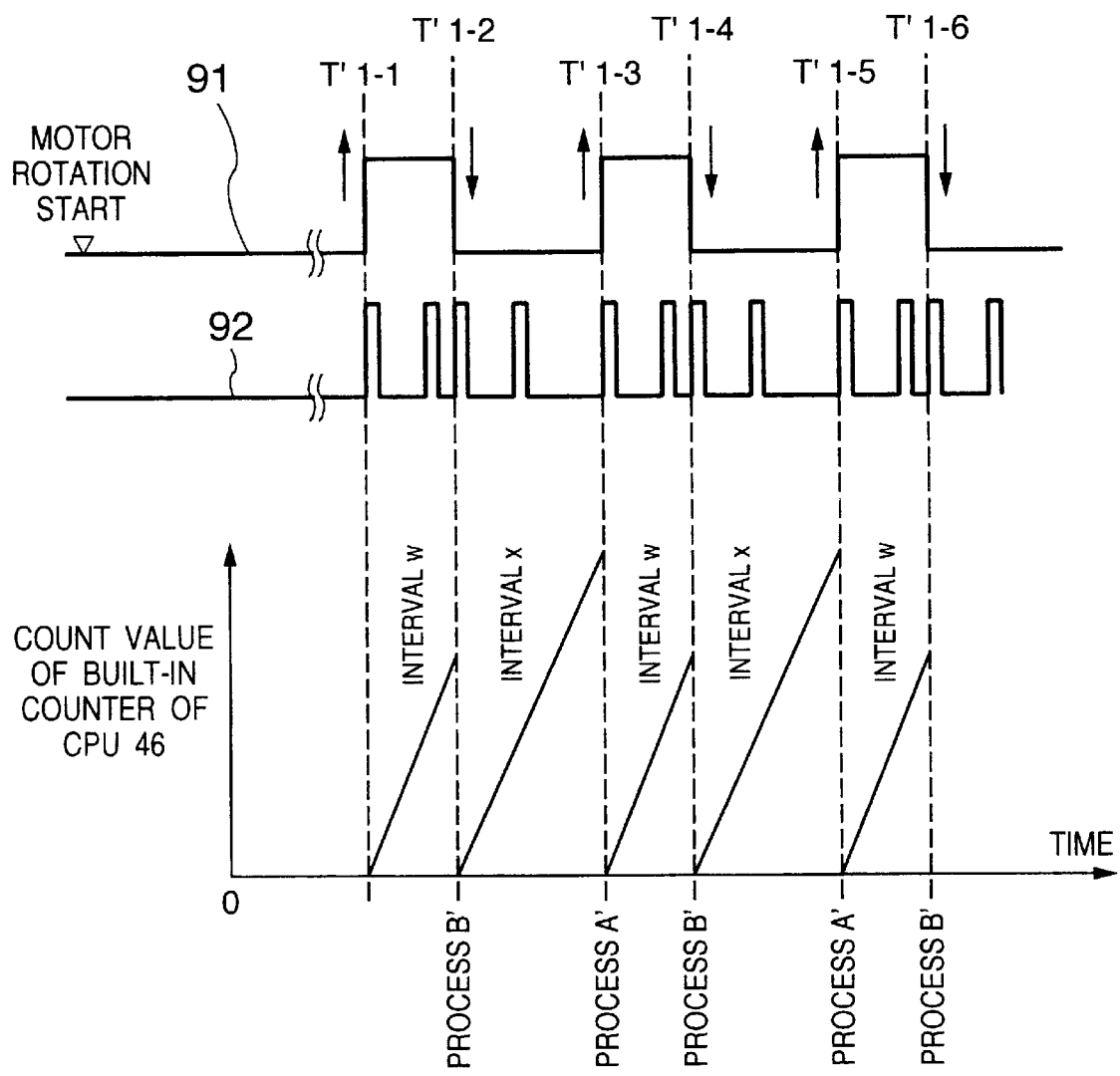
FIG. 12 is a timing chart showing a sequence of a first process for single-phase and both-side edge drive according to the second embodiment.

The first process of the present invention, or the process for obtaining the control target value will be described with reference to FIGS. 11 and 12. FIG. 12 is a timing chart showing the sequence of the first process of the single-phase and both-side edge drive in the second embodiment. The timing and process contents in this sequence are equivalent to those in the single-phase and both-side edge drive mentioned in the first embodiment, and thus the same terms are used.

Before the rotation of the drive source 55 is started, the CPU 94 sets the selector 94 so that the encoder output signal 91 can be supplied to the CPU 94.

The CPU 94 makes speed control on the drive source under this condition. This process is exactly the same as in the prior art, and thus will not be described. The drive speed of the drive source at this time is equal to the speed at which the drive source is driven with reference only to the leading edge, or the reference speed V described in the prior art.

When the drive source 55 reaches a predetermined rotation speed, the CPU 94, by interruption, detects the leading edge timing T'1-1 of the immediately succeeding encoder output signal 91. At the same time the selector 93 is set so that the edge detected output 92 can be supplied to the CPU 94. Also, the CPU 46 clears the two interval accumulation values into zero, which are variables that are given on the work memory 98 and managed by software.

Since the other conditions of CPU 94 are not changed, the built-in counter of the CPU 94 then counts the clock pulse generated from the clock generator 95 in the intervals w and x shown in FIG. 12, and the count values are copied into the built-in register.

When the CPU 94 detects the next leading edge timing T'1-2, the count value for the interval w has been already copied in the built-in register, and the CPU 94 reads out this count value from the built-in register, and stores it as count value w in the work memory 98. At the same time, the CPU 94 adds this count value to the interval accumulation value corresponding to the interval w. This process will hereinafter be referred to as "process B'".

When the CPU 94 detects the next leading edge timing T'1-3, the count value for the interval x has been already copied in the built-in register, and the CPU 94 reads out this count value from the built-in register, and stores it as count value x in the work memory 98. At the same time, the CPU adds this count value to the interval accumulation value corresponding to the interval x. In addition, the count values w and x stored in the work memory are added. The result of the addition is equivalent to the count value obtained considering only the leading edge interval of the encoder output signal 91.

The encoder output signal 91 is a signal indicating "distance" that is generated each time the drive source is rotated by a predetermined angle. In addition, since the result of adding the count values of the clock signal for each interval indicates "time", the CPU 94 can obtain the speed information of the drive source 55 by calculating the "distance" divided by the "time". Since the encoder generally constantly produces the same edge intervals of the same phase signal at very high precision, the edge interval (i.e. "distance") is considered to be constant, a predetermined constant (hereinafter called "speed conversion constant TRNV") is defined, and this constant is divided by the added result of the count values w and x to produce the speed information. This process will hereinafter referred to as "process A'".

The CPU 94 produces a speed command value on the basis of the speed information and supplies to the motor driver 96, controlling the drive source 55. This process is exactly the same as the control signal generating process in the prior art shown by the flowchart of FIG. 16, and thus will not be described.

Similarly, the process B' is executed at timing T'1-3, the process A' at the timing T'1-4 . . . sequentially and periodically. First, by using the leading edge of the encoder output signal 91, or timing T'1-1 as a start trigger it is possible to easily discriminate the intervals w and x. If the above processes are repeated, the drive source 55 can be controlled with reference to the edge detector output 92 exactly in the same way as in the case of using the encoder single-phase signal 44.

If the drive source 55 is driven in a predetermined interval, for example, an interval in which the process A' is executed a certain number of times while the drive source 55 is being controlled, the accumulation results of the count value w for the interval w and the count value x for the interval x can be obtained by the process B' and process A'. The accumulation results will be hereinafter referred to as "accumulation value w" and "accumulation value x".

The scatter of the duty ratio of the encoder output signal is peculiar to the encoder, and appears periodically in the above two intervals. Thus, if the accumulation values are obtained for the two intervals, the state of the scatter can be completely grasped. In addition, if a certain length of accumulation period is given, the effect of the externally disturbing facts on the control system can be reduced, and as a result the ratio of the accumulation values w and x may be regarded as the information indicating the distance ratio of the intervals w and x.

The period of the leading edges of the encoder output signal 91 becomes constant if the drive source 55 is ideally rotated, and the count value of the edge period is also naturally constant. This can be obtained from the target moving speeds of the bodies 51 and 69, the deceleration speed ratio of the drive system, and the frequency of the clock for use in counting the edge period. It is assumed that when the bodies 51 and 69 are driven at a predetermined speed, the drive source is driven at the reference speed V. At this time, if the leading edge period of the encoder output signal 91 is 1 ms, and if the clock frequency for the measurement of intervals is 8 MHz, the count value in the edge interval of the encoder output signal 91 is theoretically 8000. The count value is a value that can be determined by design, and will hereinafter be referred to as "theoretical count value CNTA'".

The first process obtains the theoretical count value in each interval, and the control target value for each interval on the basis of the theoretical count value.

A description will be made of a method of obtaining the theoretical count value for each interval. The theoretical count value CNTA' can be determined by design as described above. In addition, the ratio of the accumulation values w and x may be regarded as the information indicating the distance ratio of the intervals w and x. Thus, the accumulation values w and x are averaged, and represented by CNTave'. The theoretical count value CNTw for the interval w can be calculated from the equation (19) by use of CNTave', and the theoretical count value CNTx for the interval x from the equation (20).

Here, if the speed conversion constant TRNV' mentioned above is used, the speed target value VELOw for the interval w can be expressed by the equation (21), and the speed target value VELOx for the interval x by the equation (22).

The two calculated speed target values for the intervals are stored in the work memory 98 as the control target values for the corresponding intervals.

Since the scatter of the duty ratio of the encoder output signal is peculiar to the encoder as described above, there is no change with time. Therefore, for example, the first process may be executed immediately after the apparatus is turned on. In addition, for example, the first process may be performed once when the apparatus is assembled, and the control target value for each interval may be stored in the nonvolatile memory 97.

Figure 13:
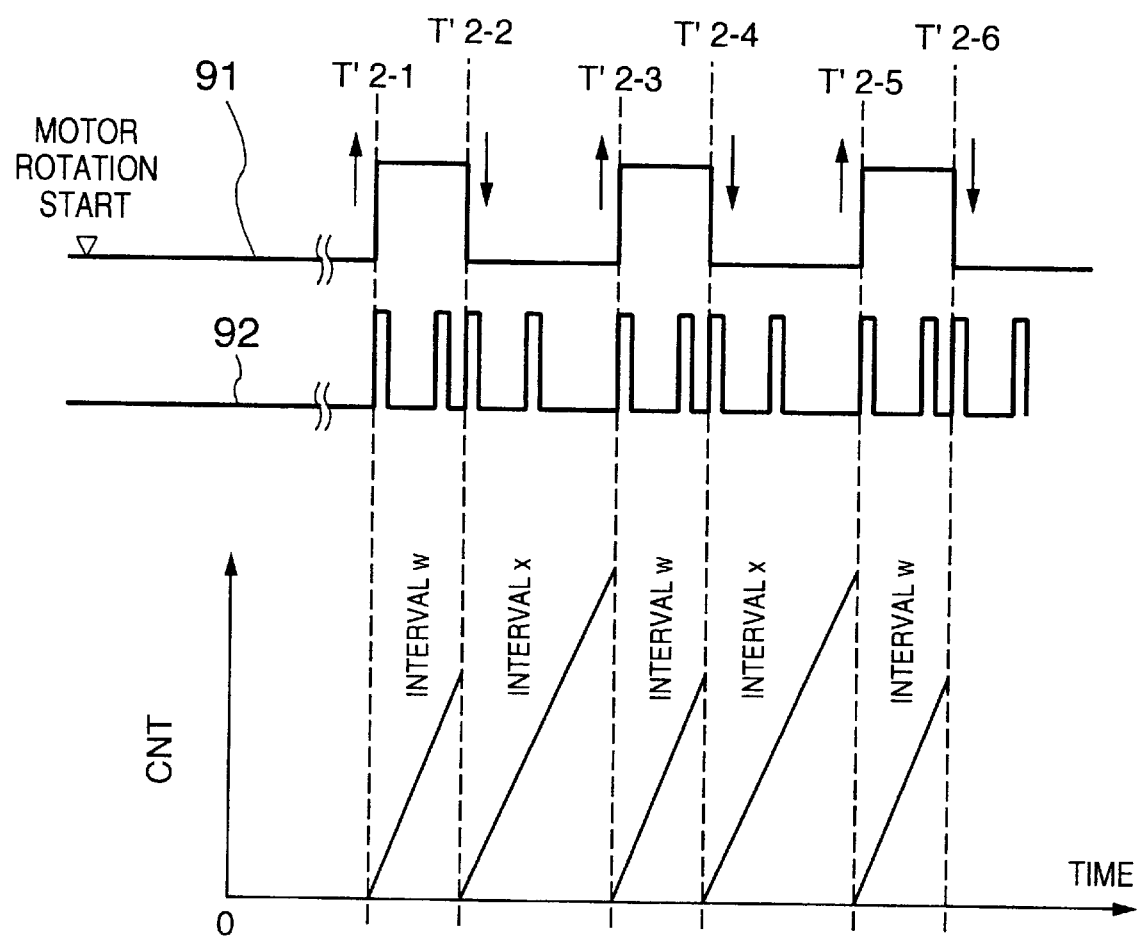
FIG. 13 is a timing chart showing a sequence of a second process at the drive speed of ½ the reference speed V according to the second embodiment.
Figure 14:
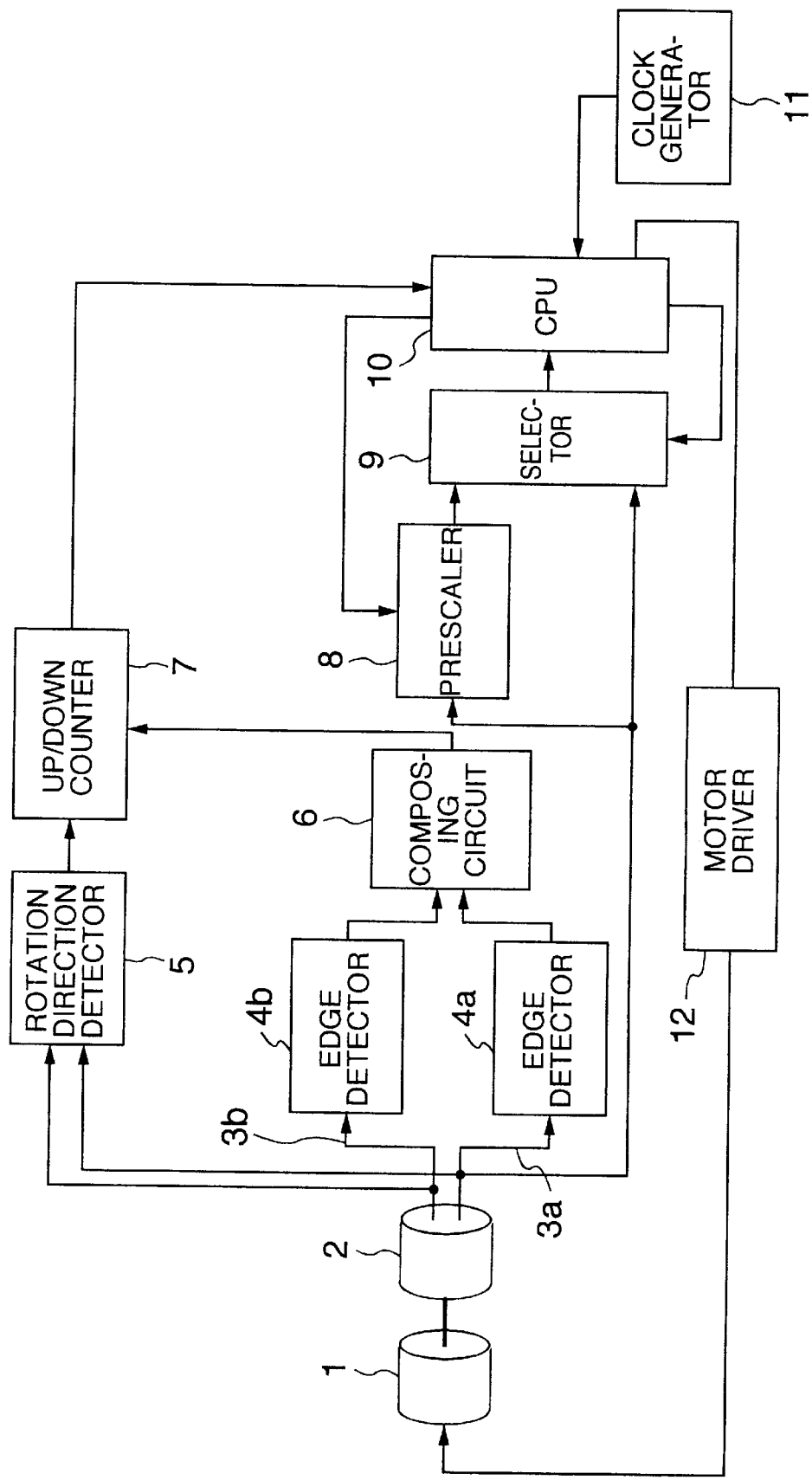
FIG. 14 is a block diagram of the construction according to the conventional drive source controlling method.
Figure 15:
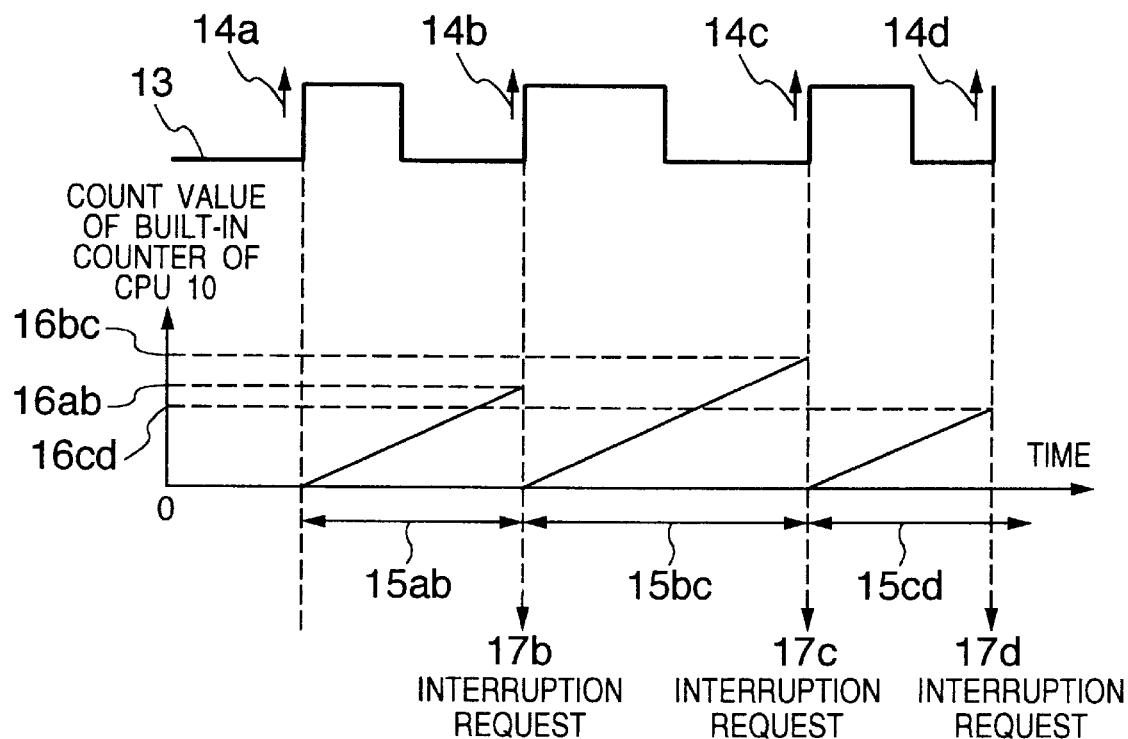
FIG. 15 is a diagram showing the process in which the CPU obtains the speed information of the drive source.

With reference to FIGS. 11 and 13, a description will be made of the second process in which the drive speed is ½ the reference speed V, or the process for controlling the drive source by use of the control target value for each interval obtained in the first process. The control flow is equivalent to the case of driving the drive source at ½ the reference speed V as described in the first embodiment, and thus will be described with reference to FIG. 9.

FIG. 13 is a timing chart showing the sequence of the second process in which the drive speed is ½ the reference speed V in the second embodiment.

Before the rotation of the drive source 55 is started, the CPU 94 can also read out from the nonvolatile memory 97 the control target value for each interval obtained in the first process, and copy it into the work memory 98. If the control target value has been already stored in the work memory 98, it can be directly utilized.

The CPU 94 sets the selector 93 so that the encoder output signal 91 can be supplied to the CPU 94. The CPU 94 makes speed control on the drive source 55 under this condition. This process is exactly the same as in the prior art, and thus will not be described.

When the drive source 55 arrives at a predetermined rotation speed, the CPU 94, by interruption, detects the immediately succeeding leading edge timing T'2-1 of the encoder output signal 91 (step 200). At this time, the set condition of the selector 93 is immediately changed so that the edge detected output 92 can be supplied to the CPU 94 (step 210).

Since the other conditions of the CPU 94 are not changed, the built-in counter of the CPU 94 counts the clock pulse generated from the clock generator 95 in the intervals w and x shown in FIG. 8, and the count values are copied into the built-in register (not shown). The count value will be abbreviated "CNT'".

When the CPU 94 detects the new leading edge timing T'2-2 (step 220), the CPU 94 starts to count the number of times of interruption from this interruption as the start point (step 230). The count value CNT' for the interval w has been already copied in the built-in register. The CPU 94 reads out this count value from the built-in register, and converts it into speed information VELO' according to the equation (23) (step 240).

It is decided if the number of times of interruption is even or odd (step 250). Since it is even, the speed information VELOw for the interval w is selected (step 260).

The speed deviation e' is calculated from the equation (24) using the speed information VELO' obtained at step 240 (step 270).

The speed deviation e' obtained at step 270 is accumulated (integrated), and the distance deviation is calculated according to the equation (25) (step 280).

The speed command value is calculated from the equation (15) using the speed deviation and distance deviation obtained at the steps 270 and 280 (step 290).

The number of times of interruption is forced to increment (step 300), and finally the CPU 94 supplies the speed command value to the motor driver 96, controlling the speed of the drive source 55 (step 310).

When the CPU 94 detects the next leading edge timing T'2-3, the step 230 is not executed because of the condition (step 220) of the number of times of interruption. The count value CNT' for the interval x has been already copied in the built-in register. The CPU 94 reads out this count value from the built-in register, and converts it into speed information VELO according to the equation (23) (step 240).

It is decided if the number of times of interruption is even or odd (step 250). Since it is odd, the speed information VELOx for the interval x is selected (step 320).

The speed deviation e' is calculated from the equation (26) using the speed information VELO' obtained at the step 240 (step 270).

The speed deviation e' obtained at the step 270 is accumulated (integrated), and the distance deviation is calculated according to the equation (22) (step 280).

The speed command value is calculated from the equation (15) using the speed deviation and distance deviation obtained at steps 270 and 280 (step 290).

The number of times of interruption is caused to increment (step 300), and finally the CPU 94 supplies the speed command value to the motor driver 96 (step 310).

The timing T'2-2 and timing T'2-3 mentioned above are periodically repeated, so that the drive source 55 can be controlled.

In the above processes, the process at step 260 can refer to the count value of the built-in counter obtained at step 240. Thus, the count value for the interval w can always be monitored at step 260. Similarly, the count value for the interval x can be monitored at step 320.

Thus, for example, the count value for the interval w can be accumulated a predetermined number of times. If this accumulation value is deviated more than a predetermined rate from the currently used theoretical count value for the interval w, the first process previously mentioned is again executed when the apparatus stands by, so as to cope with the case in which the duty ratio of the encoder is changed with time due to any trouble.

Moreover, if the control target values are previously written in the nonvolatile memory when the apparatus is assembled, the remeasured values can be updated on the nonvolatile memory when the duty ratio of the encoder is changed with time.

According to the present invention, as described above, there is provided a very simple method having the first process for detecting the leading edges and trailing edges of all the plurality of different phase signals generated from the encoder, and obtaining the control target value on the basis of the measured edge intervals, and the second process for controlling the speed of the drive source on the basis of the control target value. The first process can obtain the control target value associated with the scatter of the encoder, and the second process can control the drive source using the control target value obtained in the first process.

Thus, it is possible to realize a drive source controlling method which does not use a very expensive high-precision encoder, which can assure the frequency band without reducing the sampling rate even when the drive source is driven at a low speed, and which can prevent abnormal sound and unstable operation of the control system from being caused as seen when all the edges of all phase signals are simply detected to assure the sampling rate.

What is claimed is:

1. A motor velocity controlling method utilizing:

an encoder for producing a plurality of different phase signals according to a rotation amount of a motor;

detecting means for detecting all edges of said plurality of different phase signals; and measuring means for receiving said edges detected by said detecting means to measure intervals of edges succeeding with respect to time, said motor velocity controlling method comprising:

a first process for obtaining a control target value on the basis of a value produced from said measuring means; and a second process for controlling a drive speed of said motor on the basis of a result of comparing said value from said measuring means and said control target value, wherein in said first process, said detecting means detects leading edges and trailing edges of A-phase and B-phase signals from said encoder, and said measuring means measures four edge intervals which are an interval between the leading edge of said A-phase signal and the leading edge of said B-phase signal, an interval between the leading edge of said B-phase signal and the trailing edge of said A-phase signal, an interval between the trailing edge of said A-phase signal and the trailing edge of said B-phase signal, and an interval between the trailing edge of said B-phase signal and the leading edge of said A-phase signal, to obtain said control target value for each of said four edge intervals, and updates a control command to said motor once per period of said four intervals.

2. A method according to claim 1, further utilizing particular state detecting means for detecting a particular edge of a particular one of said plurality of different phase signals from said encoder, wherein said first process is started on the basis of a detection timing in said particular state detecting means.

3. A method according to claim 1, wherein said second process is started on the basis of the detection timing in said particular state detecting means.

4. A motor velocity controlling method utilizing:

an encoder for producing a plurality of different phase signals according to a rotation amount of a motor;

detecting means for detecting edges of said plurality of different phase signals, each of said edges satisfying a predetermined condition; and measuring means for receiving said edges detected by said detecting means to measure intervals of edges succeeding with respect to time, said motor velocity controlling method comprising:

a first process for obtaining a control target value on the basis of a value produced from said measuring means; and a second process for controlling a drive speed of said motor on the basis of a result of comparing said value from said measuring means and said control target value, wherein in said first process, said detecting means detects a leading edge and a trailing edge of one of said plurality of different phase signals from said encoder, and said measuring means measures two edge intervals, which are an interval between the leading edge and the trailing edge and an interval between the trailing edge and the leading edge, to obtain said control target value for each of said two edge intervals, and updates a control command to said motor once per period of said two intervals.

5. A method according to claim 4, further utilizing particular state detecting means for detecting a particular edge of one of said plurality of different phase signals from said encoder, wherein said first process is started on the basis of a detection timing in said particular state detecting means.

6. A method according to 4, wherein said second process is started on the basis of the detection timing in said particular state detecting means.

7. A method according to claim 4, further utilizing memory means for storing said control target value, wherein said first process is executed immediately after a power supply of an apparatus including said motor is turned on, causing said control target value to be stored in said memory means, and thereafter said motor is controlled by use of said control target value stored in said memory means.

8. A method according to claim 4, further utilizing memory means for storing said control target value, wherein while said second process is being executed, said edge interval is measured, and said control target value is updated in accordance with said measured result.

9. A motor velocity controlling method utilizing:

an encoder for producing a one-phase signal in accordance with a rotation amount of a motor;

detecting means for detecting all edges of said one-phase signal; and measuring means for receiving said edges detected by said detecting means to measure intervals succeeding with respect to time, said motor velocity controlling method comprising:

a first process for obtaining a control target value on the basis of a value measured by said measuring means; and a second process for controlling a drive speed of said motor on the basis of a result of comparing said value measured by said measuring means and said control target value, wherein in said first process, said detecting means detects a leading edge and a trailing edge of said one-phase signal from said encoder, and said measuring means measures two edge intervals which are an interval between the leading edge and the trailing edge and an interval between the trailing edge and the leading edge, to obtain said control target value for each of said two edge intervals, and updates a control command to said motor once per period of said two intervals.

10. A method according to claim 9, further utilizing particular state detecting means for detecting a particular edge of said one-phase signal from said encoder, wherein said first process is started on the basis of a detection timing in said particular state detecting means.

11. A method according to claim 9, wherein said second process is started on the basis of the detection timing in said particular state detecting means.

12. A method according to claim 1, further utilizing memory means for storing said control target value, wherein said first process is executed immediately after a power supply of an apparatus including said motor is turned on, causing said control target value to be stored in said memory means, and thereafter said motor is controlled by use of said control target value stored in said memory means.

13. A method according to claim 1, further utilizing memory means for storing said control target value, wherein while said second process is being executed, said edge interval is measured, and said control target value is updated in accordance with said measured result.

14. A method according to claim 8, further utilizing memory means for storing said control target value, wherein said first process is executed immediately after a power supply of an apparatus including said motor is turned on, causing said control target value to be stored in said memory means, and thereafter said motor is controlled by use of said control target value stored in said memory means.

15. A method according to claim 8, further utilizing memory means for storing said control target value, wherein while said second process is being executed, said edge interval is measured, and said control target value is updated in accordance with said measured result.

* * * * *